United States Patent [19]

Rozier

[11] Patent Number: 5,321,221
[45] Date of Patent: Jun. 14, 1994

[54] SELF-DISCONNECTING CIRCUIT-BREAKER FOR MEDIUM TENSION, AND USE THEREOF IN A MEDIUM-TENSION STATION OR BAY

[75] Inventor: Paul Rozier, Chalon sur Saone, France

[73] Assignee: GEC Alsthom SA, Paris, France

[21] Appl. No.: 977,786

[22] Filed: Nov. 17, 1992

[30] Foreign Application Priority Data

Nov. 20, 1991 [FR] France ............... 91 14311

[51] Int. Cl.⁵ .................. H01H 33/42; H01H 33/52
[52] U.S. Cl. .................. 200/145; 200/144 B
[58] Field of Search .......... 200/50 R–50 AA, 200/144 R, 144 B, 145, 148 R, 148 D, 148 F, 150 J, 150 JA, 150 L; 361/334–339, 341–343, 345, 355, 371, 390, 391, 430, 431, 432

[56] References Cited

U.S. PATENT DOCUMENTS

| | | | |
|---|---|---|---|
| 2,952,799 | 9/1960 | Wortman et al. ............ | 317/103 |
| 3,751,617 | 8/1973 | Bohlinger et al. ............ | 200/144 B |
| 3,813,506 | 5/1974 | Mitchell ............ | 200/144 B |
| 3,814,885 | 6/1974 | Sofianek ............ | 200/144 B |
| 3,970,809 | 7/1976 | Mitchell ............ | 200/144 B |
| 4,038,585 | 7/1977 | Wolski et al. ............ | 361/334 |
| 4,521,657 | 6/1985 | Thuries ............ | 200/148 R |
| 4,568,804 | 2/1986 | Luehring ............ | 200/144 B |
| 4,654,494 | 3/1987 | Wüthrich ............ | 200/337 |

FOREIGN PATENT DOCUMENTS

| | | |
|---|---|---|
| 0094858 | 11/1983 | European Pat. Off. . |
| 0405253 | 1/1991 | European Pat. Off. . |
| 1870065 | 4/1963 | Fed. Rep. of Germany . |
| 1533266 | 6/1968 | France . |
| 1189249 | 4/1970 | United Kingdom . |

Primary Examiner—A. D. Pellinen
Assistant Examiner—Michael A. Friedhofer
Attorney, Agent, or Firm—Sughrue, Mion, Zinn, Macpeak & Seas

[57] ABSTRACT

A multipolar isolating circuit-breaker comprising, for each pole, an insulating feedthrough containing a vacuum bottle, the feedthrough including a first contact at a first end connected to a first terminal of the bottle and designed to co-operate with a first conductor, and a second contact at a second end connected to a second terminal of the bottle and designed to co-operate with a second conductor, the feedthroughs being secured to a common metal bar sheltering a common shaft for driving the bottles and actuated by a mechanism contained in a box. The circuit-breaker is applicable to medium-tension bays and stations.

44 Claims, 29 Drawing Sheets

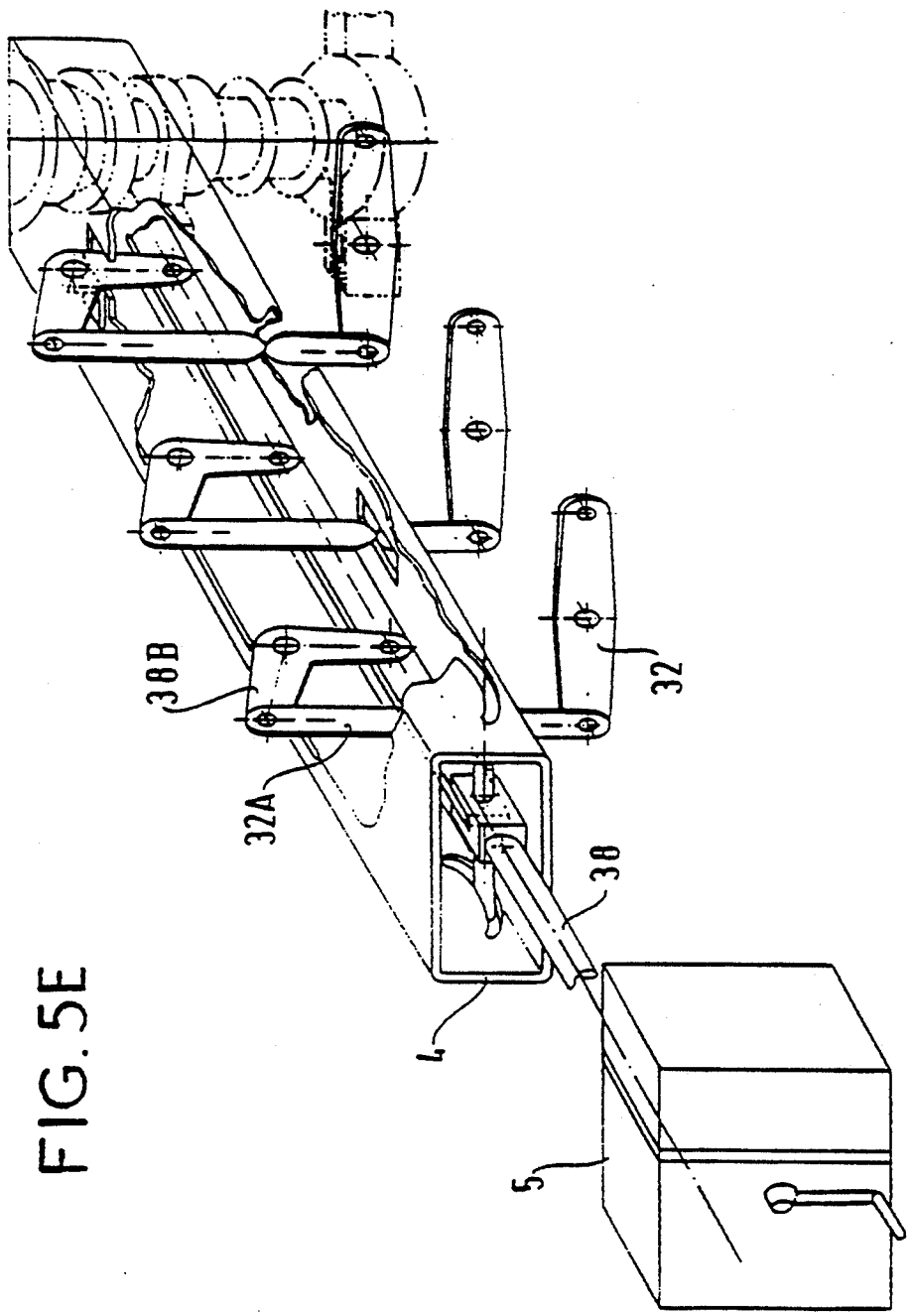

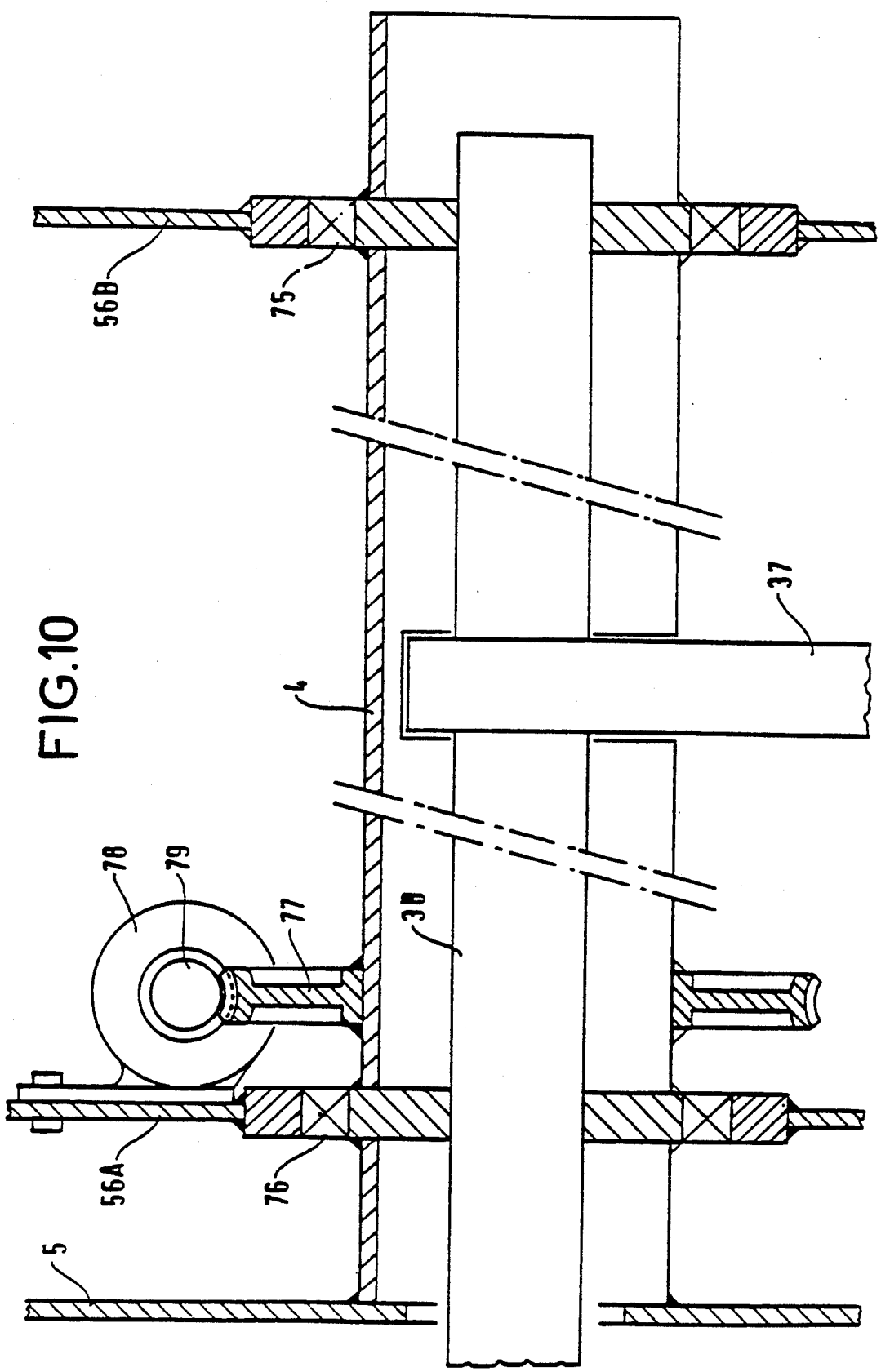

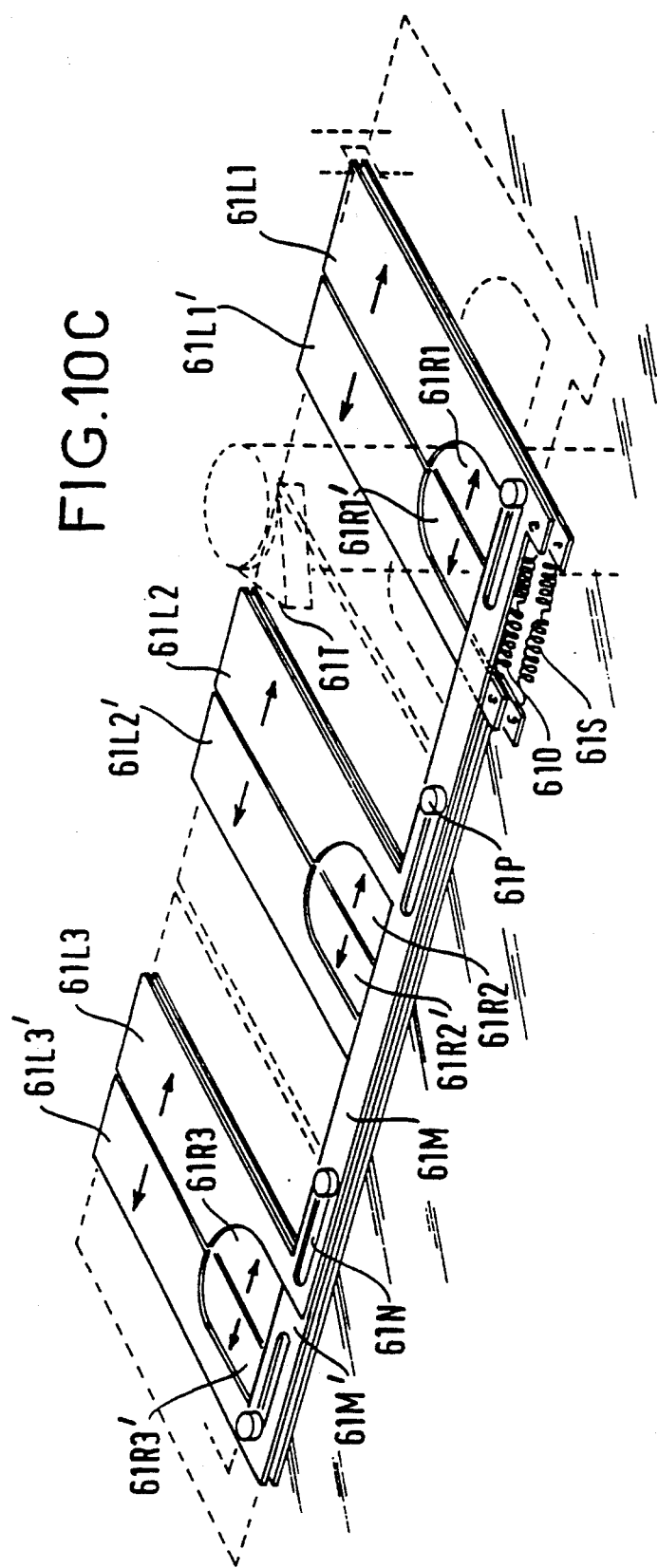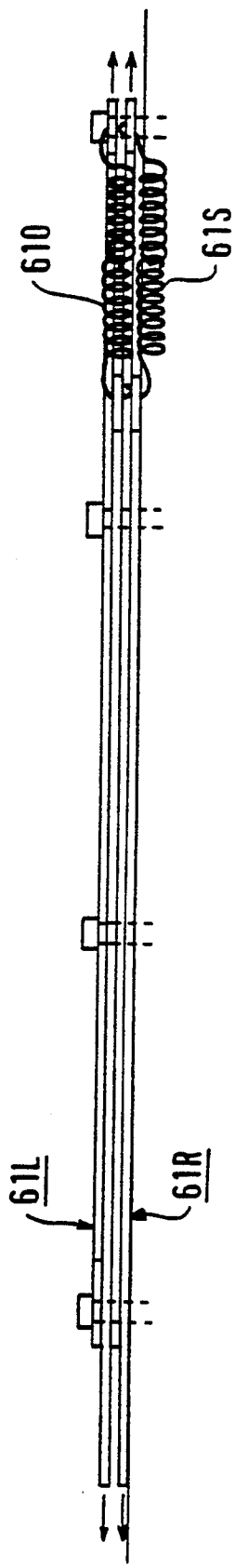

SELF-DISCONNECTING CIRCUIT-BREAKER FOR MEDIUM TENSION, AND USE THEREOF IN A MEDIUM-TENSION STATION OR BAY

The present invention relates to a self-disconnecting circuit breaker usable at medium-tension up to 36 kV, with extension possible up to 72 kV, and to use thereof in indoor or outdoor medium-tension stations and bays.

The term "isolating self-disconnecting circuit-breaker" is used to designate an electrical apparatus having both the functions of a switch and of a disconnector. The apparatus has the current-interrupting power of a circuit-breaker. When the apparatus is in its disconnecting position, presents dielectric strength between its input and output terminals equal to or greater than the dielectric strength required of a section switch. Such an apparatus can thus replace three equipment functions, and this is particularly advantageous for the operator thereof, both because of the saving achieved in investment (lower cost, lower ground area usage) and because of savings in maintenance while the equipment is in use.

BACKGROUND OF THE INVENTION

French patent No. 1 533 266 discloses a metal-clad bay comprising, for each phase, a rotary interrupter apparatus, with rotation of the apparatus about an axis lying in a virtual plane of symmetry of the bay providing section isolation therefore.

It has not been possible to construct that apparatus industrially because of the large volume and weight of the sealed type interrupter apparatuses containing a non-flammable fluid that are proposed, in particular sulfide hexafluoride ($SF_6$) circuit-breakers. Another handicap results from the length of the stroke of the $SF_6$ circuit-breakers which penalizes the above-mentioned type of apparatus because of the excessive length required.

German petty-patent No. 1 870 065 also discloses a circuit-breaker whose poles are disposed on a horizontal bar capable of pivoting about its axis and of providing the section-isolating function of the circuit-breaker. When the circuit-breaker is in its disconnecting position, its poles are inclined and as a result its isolation distance is reduced, thereby requiring the apparatus to be over-dimensioned in order to obtain dielectric strength. Another drawback of that device is that when it is in its isolating position, its poles are at a potential that is not determined (floating potential).

Another drawback of the circuit-breaker described in the above-mentioned document is the need to use an insulating plate to isolate the front face of the apparatus when the circuit-breaker is extracted.

Another drawback is that in the event of excess voltage between a set of busbars and cables, the gap between said elements may be bridged by an arc.

Another drawback is that the poles of the circuit-breaker are necessarily controlled by rotation and cannot be controlled by a push-pull action.

Another drawback is that the poles must be provided with connectors for making connection with the busbars or with the cable heads, and this excludes any direct engagement.

A first object of the invention is to provide a multi-pole self-disconnecting circuit-breaker of low weight and small size in all dimensions, thus making it easily received in a bay and easily driven without requiring high driving energy.

Another object of the invention is to provide a self-disconnecting circuit-breaker at low cost.

Another object of the invention is to provide a self-disconnecting circuit-breaker in which the items relating to the various poles, in general three poles for a three-phase apparatus, can be placed in the same extractible drawer in a cabinet of a bay, with easy front access to the outgoing cables and to the set of busbars in a station constituted by juxtaposing a plurality of bays.

Another object of the invention is to provide a self-disconnecting circuit-breaker that is easily inspected, and enabling pole equipment to be interchanged or enabling an entire pole to be replaced.

Another object of the invention is to provide a self-disconnecting circuit-breaker that avoids the above-mentioned drawbacks of the prior art.

Another object of the invention is to provide a medium tension bay provided with the self-disconnecting circuit-breaker of the invention, said medium-tension bay enabling current to be interrupted, section isolation to be obtained upstream and downstream, and current to be detected to provide protection against short circuits, said bay including all of the items required for supporting the set of busbars, for anchoring the cables, for visible earthing with a visible indication that voltage is present, for separating the cable compartments and the sets of busbars, for driving the circuit breaking and disconnecting functions, and for extraction purposes when, exceptionally, it is necessary to inspect the self-disconnecting circuit-breaker.

An object of the invention is to provide a bay of the above-specified type that occupies considerably less ground area than analogous bays of the prior art.

Another object of the invention is to provide a bay of the above-specified type in which the risks of faults between phases are very low.

Another object of the invention is to provide a medium tension station that is cheap to construct, in which the risks of a fault appearing between phases are extremely low and in which the risks of a ground fault propagating and progressing are very low.

SUMMARY OF THE INVENTION

The present invention provides a multipolar self-disconnecting circuit-breaker comprising, for each pole: an insulating feedthrough containing a vacuum "bottle", the feedthrough including a first contact at a first end connected to a first terminal of the bottle and designed to co-operate with an inlet conductor, and a second contact at a second end connected to a second terminal of the bottle and designed to co-operate with an outlet conductor, the feedthroughs being fixed to a metal bar having a drive shaft common to the bottles running therealong and protected thereby, the shaft being actuated by bottle drive control means contained in a box, and the bar being rotated to perform the disconnecting function.

In a particular embodiment, each pole comprises an insulating feedthrough comprising a first portion containing a vacuum bottle, said vacuum bottle including an insulating case closed by first and second metal endplates, the first metal endplate carrying a first jaw terminal outside the case and a fixed contact inside the case, the second endplate having a moving metal rod carrying a moving contact passing therethrough in sealed manner, the insulating feedthrough including a cylindrical second portion inside which a metal tube is coaxially disposed and is mechanically connected to the vacuum bottle, and is electrically connected to said moving metal rod, said tube containing a control rod connected to said moving metal rod, the insulating feedthroughs of the various poles being fixed to said metal bar substantially where the first and second portions of each feedthrough meet, the control rod for each pole being mechanically connected to said control shaft by a lever hinged on an endpiece secured to the metal tube, an insulating arm hinged at one end to said lever and at a second end to a crank connected to said shaft, said endpiece being mechanically and electrically connected to said metal tube and constituting a second jaw terminal.

The invention also provides a medium-tension bay characterized in that it comprises at least one self-disconnecting circuit-breaker of the above-specified type.

BRIEF DESCRIPTION OF THE DRAWINGS

Embodiments of the invention are described by way of example with reference to the accompanying drawings, in which:

FIG. 5E is a perspective view of a variant embodiment of the means for driving the vacuum bottle of the poles;

FIG. 10 shows the section-switch drive mechanism for the self-disconnecting circuit-breaker of the invention;

FIG. 10C is a perspective view of the protective flaps in a variant embodiment;

FIG. 10D is a side view of the flaps in FIG. 10;

DETAILED DESCRIPTION

Figure 1:
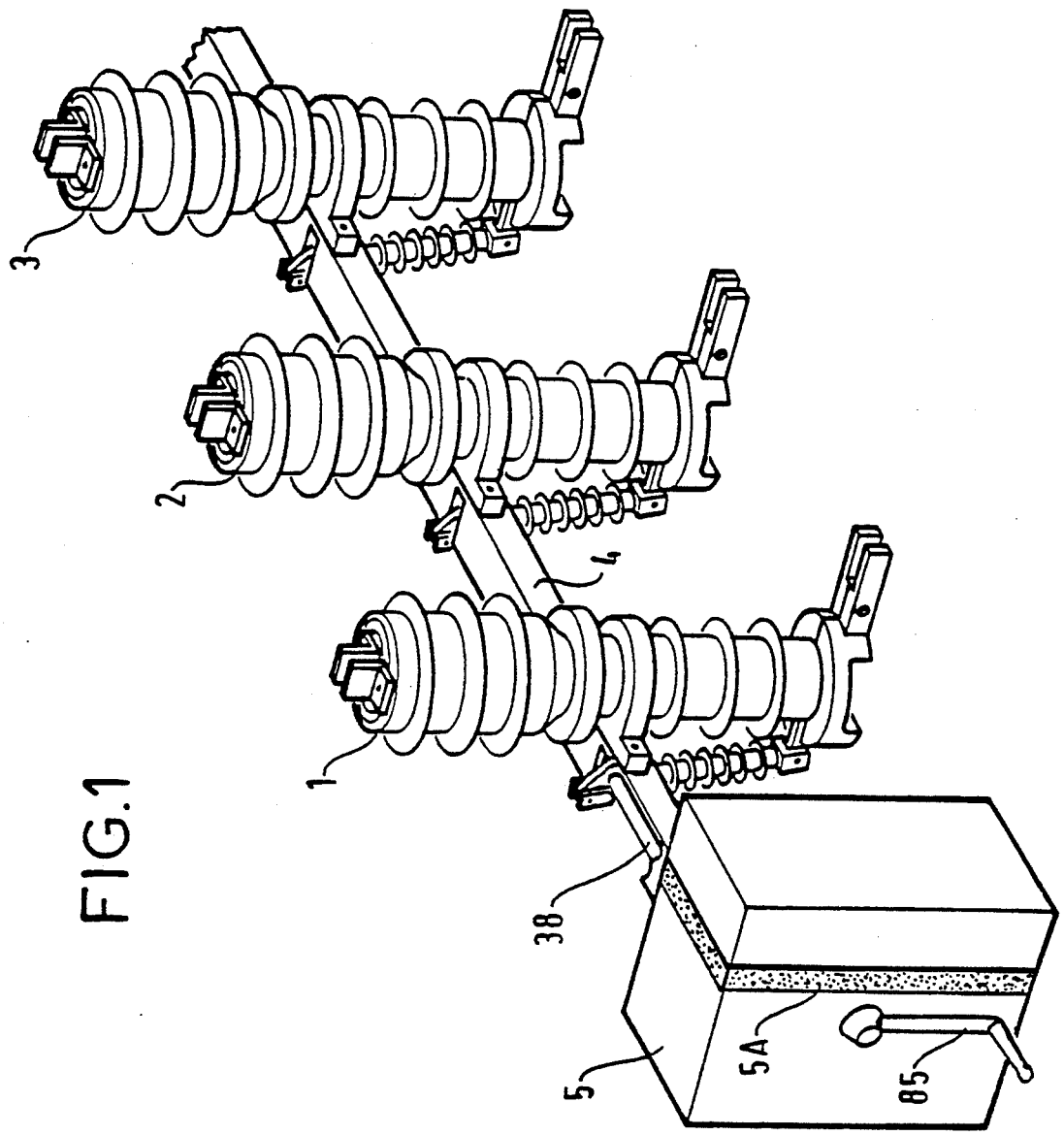
FIG. 1 is a diagrammatic perspective view of a three-phase self-disconnecting circuit-breaker of the invention.

FIG. 1 is a diagrammatic perspective view of a three-phase self-disconnecting circuit-breaker of the invention.

The poles of the self-disconnecting circuit-breaker are referenced 1, 2, and 3. They are fixed to a common metal bar, preferably of angle section, with a pole control shaft 38 being disposed along said bar and being protected by said bar.

The bar 4 is at ground potential. As described in detail below, the bar is capable of rotating about its own axis to drive the isolating function of the apparatus. The shaft 38 is actuated by means of a control box 5 to cause the apparatus to perform its interrupting function.

The assembly constituted by the bar and the poles is well balanced so that the above-mentioned section-isolating operation requires little energy.

Figure 2:
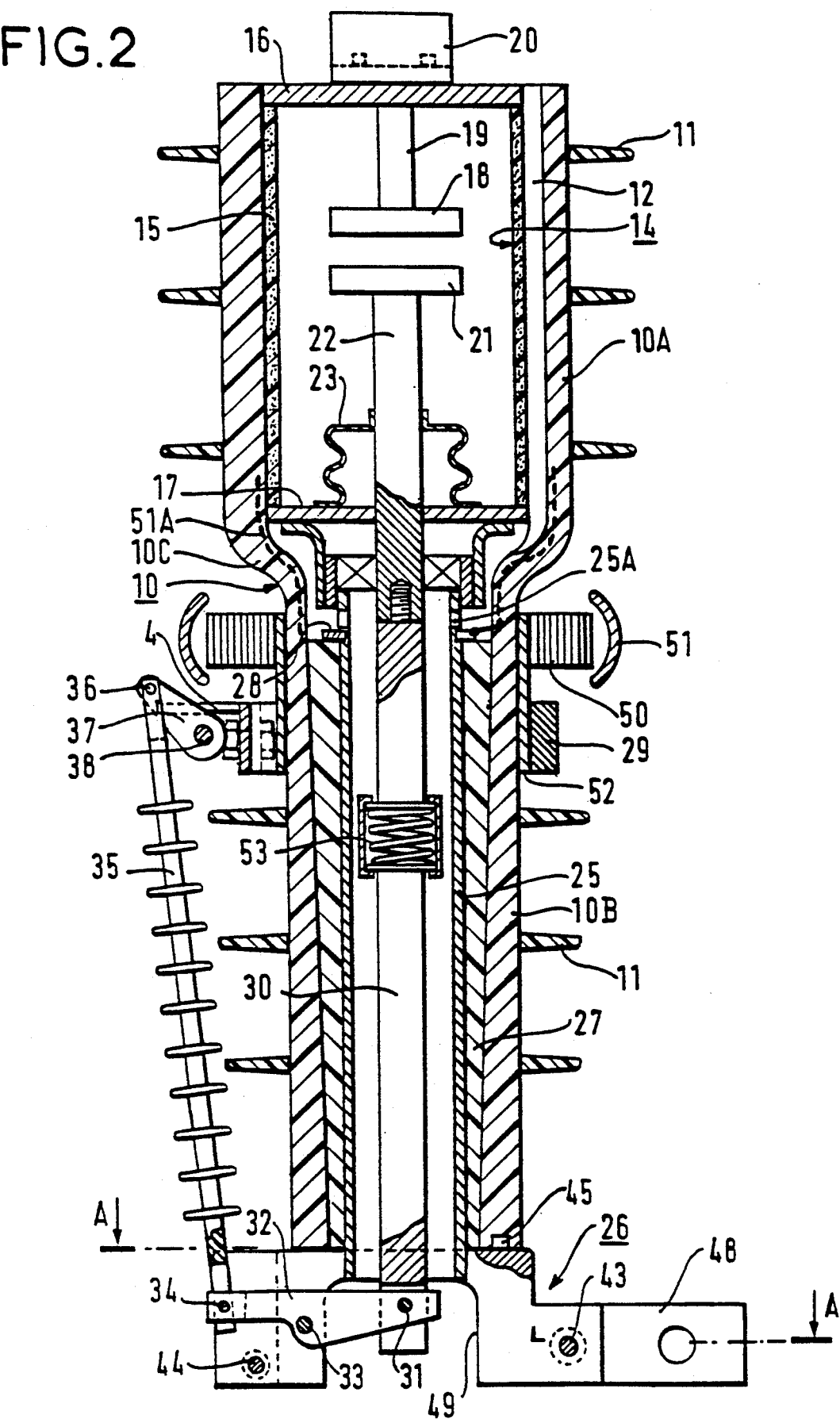
FIG. 2 is an axial section view through one pole of a self-disconnecting circuit-breaker of the invention.

FIG. 2 is an axial section view through one pole, e.g. the pole 1. Naturally, the poles are completely identical and interchangeable.

The pole comprises an insulating feedthrough 10 made of resin or of elastomer and provided with fins 11. In one particular embodiment, the fins are add-ons, in a variant they are integrally molded with the feedthrough.

A first portion 10A of the feedthrough is tubular in shape and contains a vacuum "bottle" 14 that is shown diagrammatically.

The vacuum bottle comprises an insulating case 15 preferably made of ceramic, and two metal endplates 16 and 17. A rod 19 carrying a fixed contact 18 is secured to one side of the plate 16 whose other side is secured to a first jaw terminal 20.

The vacuum bottle includes a moving contact 21 carried by a metal rod 22 that slides in sealed manner through the plate 17 because of a sealing bellows 23.

The inside surface of the portion 10A of the feedthrough is provided with grooves 12 parallel to the axis of the feedthrough and serving as ventilation channels, as explained below.

Figure 3:
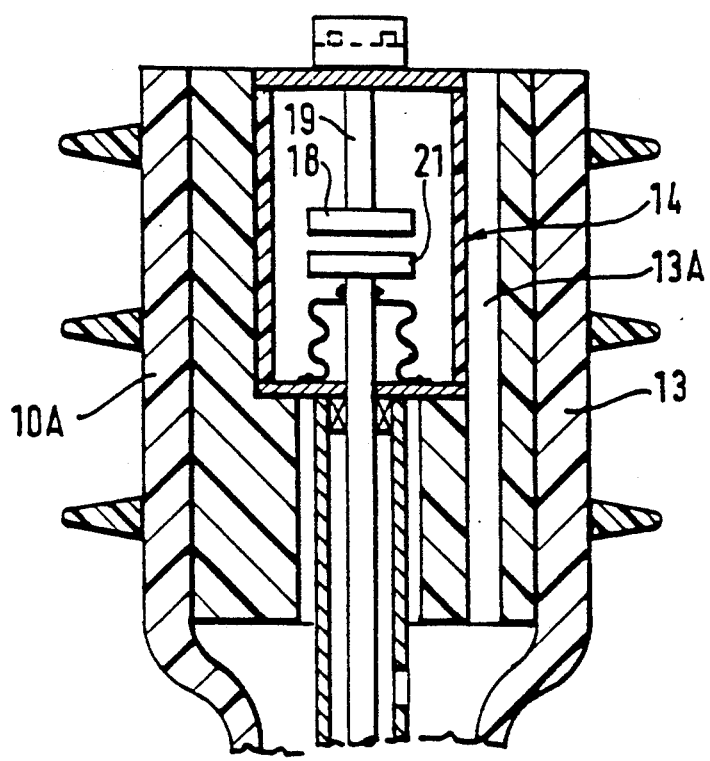
FIG. 3 is a fragmentary axial section view of a variant embodiment of a pole.

It may be observed that the dimensions of the portion 10A of the feedthrough, and in particular its inside diameter and its inside depth, are preferably chosen to enable the largest sizes of vacuum bottles to be received. If a smaller bottle is to be installed, then a cylindrical cage 13 of insulating material such as resin is interposed between the inside of the feedthrough 10A and the vacuum bottle 14, as shown in FIG. 3. The cage 13 is provided with inside grooves 13A that co-operate with the side surface of the vacuum bottle to define ventilation channels.

Returning to FIG. 2, it can be seen that the insulating feedthrough includes a second portion 10B which is also tubular but of smaller diameter than the portion 10A, and which is connected thereto via a throat 10C. The inside surface of the portion 10B is conical, with the thickness of the feedthrough wall increasing progressively going away from the throat 10C. Naturally, the portions 10A, 10B, and 10C constitute a single part obtained by molding. The portion 10B contains a metal tube 25 preferably made of copper and secured to the vacuum bottle as described with reference to FIG. 5, and in electrical contact with the moving rod 22 of the vacuum bottle. The tube 25 serves to convey current between the vacuum bottle and a part of complex shape 26 that serves, in particular, as a second connection jaw terminal for the apparatus.

Dielectric strength is provided between the feedthrough 10B and the metal tube 25 by means of a sheath 27 made of an insulating material such as latex, and generally in the form of a tube having a cylindrical inside surface and a conical outside surface which is complementary to the inside surface of the portion 10B of the insulating feedthrough. On assembly, the sheath is slid over the metal tube 25 with sliding being facilitated by using an insulating grease, e.g. based on silicone. The outside surface of the sheath is then coated with the same grease and is engaged in the portion 10B of the insulating feedthrough, with pressure being exerted so as to ensure that air is eliminated. The sheath is maintained under compression by stop means such as a spring clip 28 engaged in a groove in the tube 25.

The pole is fixed to the metal bar 4 by means of a fixing collar 29.

Opening or closing drive for the vacuum bottle is provided by means of a rod 30, e.g. made of metal and attached to the rod 22, for example by screw fastener means. The rod 30 is hinged at 31 to a rocker lever 32 that is pivoted at 33 on the part 26. The other end of the lever is hinged at 34 to a first end of an insulating rod 35 whose second end is hinged at 36 to a first end of a crank 37 whose second end is secured on the control shaft 38 running along the bar 4.

In the vicinity of the plate 17, the copper tube 25 has holes 25A for a function that is explained below.

When the nominal current is flowing through the vacuum bottle, it is heated up by the Joule effect. The bottle is cooled by circulating air through the part 26, through the annular space between the drive rod 30 and the tube 25, through the holes 25A, and into the grooves 12 of the portion 10A of the feedthrough. This ventilation circuit is of major importance since it makes it possible to eliminate risks of pollution and of condensation.

Figure 4:
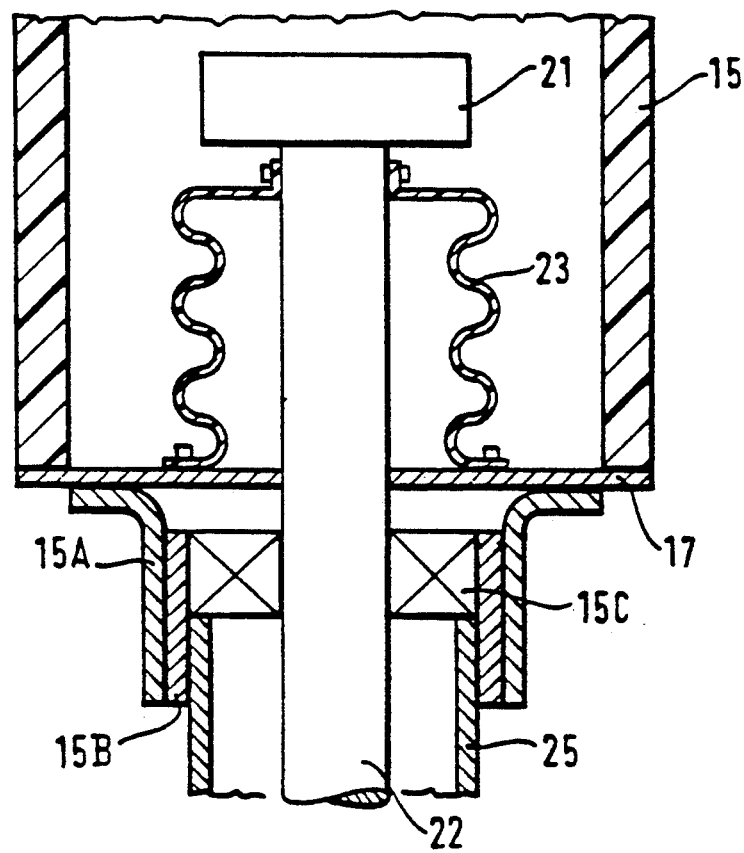
FIG. 4 is on a larger scale and shows dispositions for mechanically and electrically connecting the metal tube to the vacuum "bottle"

Reference is made to FIG. 4 which shows how the metal tube 25 is mechanically fixed to the vacuum bottle 14 and how current can flow from the moving rod 22 to the tube 25.

Vacuum bottles generally include a metal cap welded to the plate 17 and containing a bearing for the moving rod 22. For the purposes of the invention, the cap is changed and transformed into a sleeve 15A having an inside thread suitable for receiving a metal ring 15B. The tube 25 is engaged inside said ring and is secured to the ring by brazing or by screwing. The ring and the tube then define a shoulder having a concertina-type contact or a contact thimble 15C pressing thereagainst.

Figure 5:
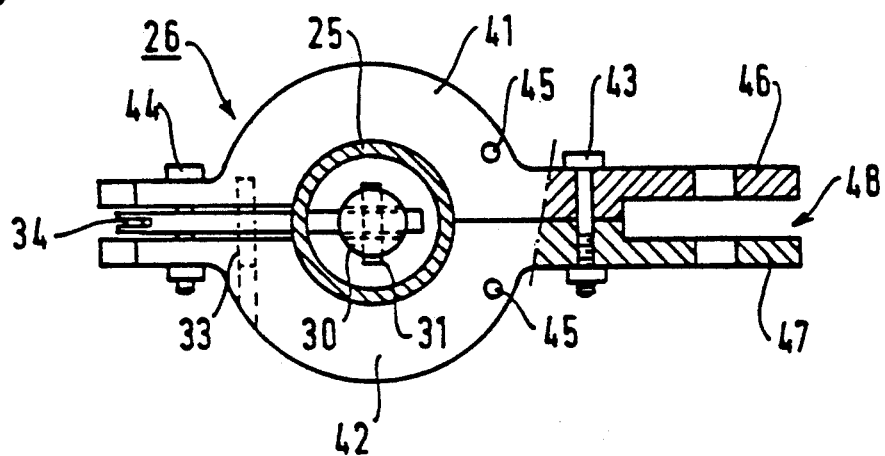
FIG. 5 is a section view on line A—A of FIG. 2.

The shape and the function of the part 26 are specified with reference to FIG. 5. It can be seen that the part 26 comprises two half-collars 41 and 42 capable of being clamped together by means of screws 43 and 44. These collars are clamped onto the end of the conductive tube 25 with contact pressure that is sufficient to ensure good current flow. The half-collars come into abutment against the end of the portion 10B of the feedthrough, thereby preventing the tube 25 and the vacuum bottle 14 to which it is connected moving in translation.

Studs 45 carried by the half-collars co-operate with recesses at the end of the feedthrough 10B to prevent the tube 25, and consequently the vacuum bottle 14, from rotating.

Two of the collar lugs 46 and 47 extend to constitute the second jaw terminal 48 of the apparatus.

The screw 44 clamps the hinge 33 for the rocker lever 32.

The collars are notched at 49 to leave room for the hinge 31.

It may be observed that the part 26 can be modified to allow electrical contact between the pole and a set of busbars situated vertically beneath the pole. In addition, the part 26 may receive two half-shell metal caps (not shown) so as to give this part a shape that is favorable from the dielectric point of view.

Finally, the pole includes a current sensor 50 in the form of a coil having a toroidal magnetic circuit. If the fins are add-ons, then the toroidal coil can be closed and slid over the feedthrough 10B before the fins 11 are installed. If the fins are integrally molded with the feedthrough, then the magnetic circuit is of the open type.

The outside of the feedthrough, level with the torus 50 and the collar 29 of the support for the bar 4, is coated with metal plating 52 for equalizing potential which in this case is ground potential.

The torus 50 may be surrounded by an anticorona cap 51 which is held in place by conventional means (not shown).

In a variant, it may be observed that the torus may be placed inside the insulating case, with the case being molded thereover.

FIG. 2 shows that there is a volume full of air present between the endplate 17 and the intermediate portion 10C of the feedthrough. Unless special precautions are taken, this volume would be subjected to a high potential gradient which could give rise to partial discharges that can be destructive in the long run. To avoid this drawback, the feedthrough includes a metal grid 51A level with said volume and integrally molded in the feedthrough, which grid is put to the same potential as the metal tube 25. As a result, potential differences are applied to insulating portions only.

The drive rod 30 may include a backlash take-up member comprising a cage fitted with a spring 53. In a variant, this backlash take-up member may be disposed at any convenient location in the chain of moving parts connecting the rod 22 to the control shaft 38.

Figure 5A:
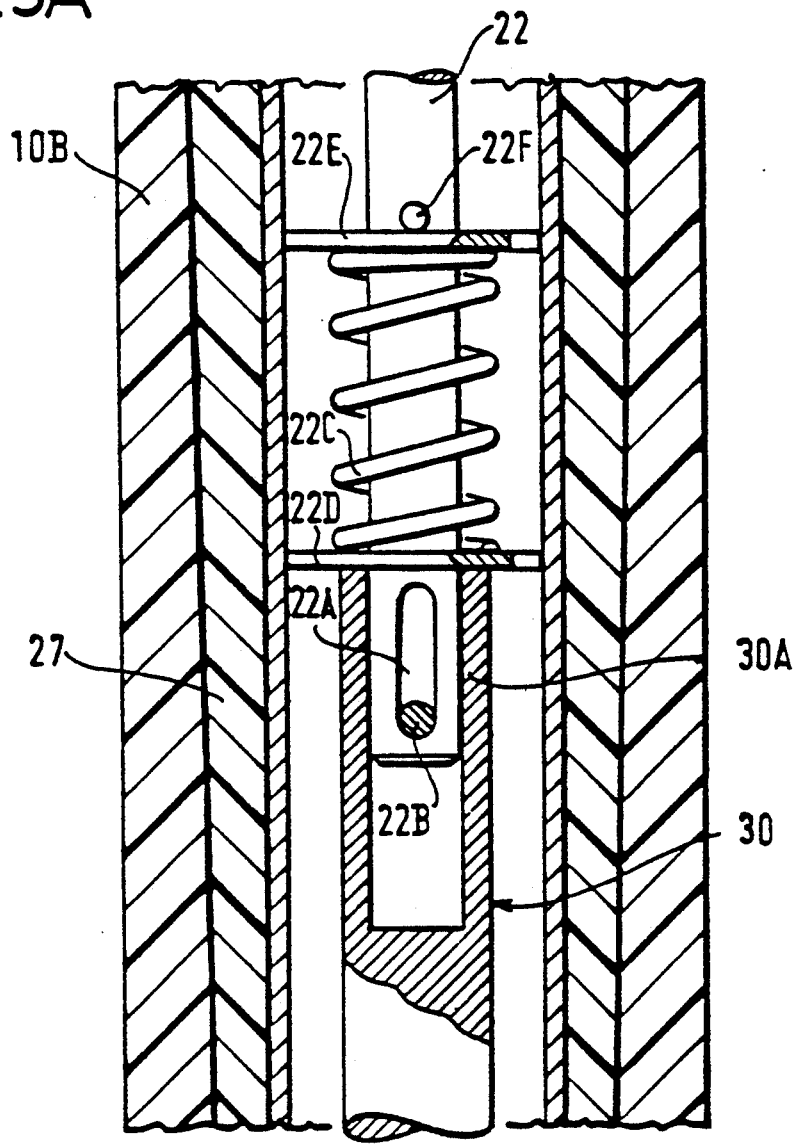
FIG. 5A is an elevation view in section of a backlash take-up device for controlling the contacts of the bottle.

Since this cage can be too bulky under some circumstances, it may be replaced by the device described below with reference to FIG. 5A.

At least the end of the control rod 30 has a tubular portion 30A in which the end of the moving rod 22 of the bottle is engaged. The metal moving rod 22 has a slot 22A which receives a first pin 22B passing through the rod 30. A spring 22C is disposed between a first thrust washer 22D in contact with the end of the tubular portion 30A and a second washer 22E engaged on the rod 22 and retained by a second pin 22F passing through the rod 22. In the position where the contacts of the bottle are closed, the rod 30 compresses the spring 22C which transmits force without slack to the moving rod 22. On opening, the rod 30 pulls the rod 22. It may be observed that the backlash take-up assembly is guided in the conductive tube 25 by the thrust washers 22D and 22E of the spring. The washers have holes or notches in their peripheries for allowing a flow of cooling air to pass over the bottle.

It is said above that only the end of the control rod is made in the form of a tube. In a variant, the control rod may be in the form of a tube over its entire length.

The control rod 38 is fixed to the metal bar 4 by conventional means (not shown) so as to leave it free to rotate. The shaft may be more fully protected by means of an angle section bar (not shown) e.g. made of plastic and clipped to the metal bar 4 so as to define a chest section beam, thereby sheltering the shaft 38 from dust.

Figure 5B:
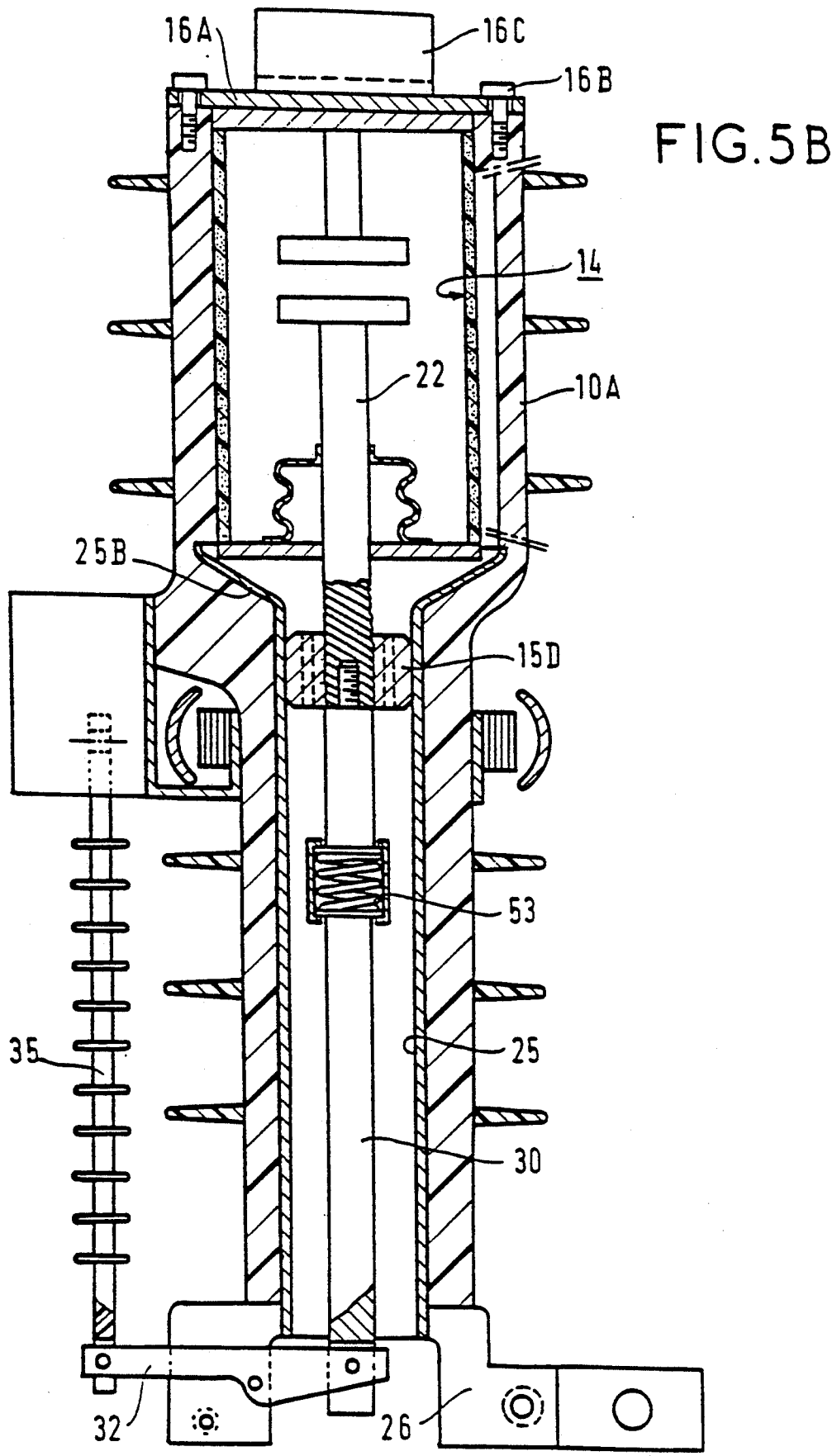
FIG. 5B is an elevation view of one pole constituting a variant embodiment of the invention.

FIG. 5B is an elevation view in axial section showing a pole constituting a variant embodiment of the invention. Items that are common to FIGS. 2 and 5B are given the same reference numerals. The copper tube 25 has a top portion 25B which is enlarged by spinning so as to constitute the bottom portion of the housing for the vacuum bottle. The drive rod 30 is directly screwed to the moving contact 21 of the vacuum bottle. Electrical connection between the rod 22 of the vacuum bottle and the tube 25 is provided by contact springs 15D. The top of the portion 10A of the feedthrough is closed by a plate 16A screwed down by screws 16B that co-operate with inserts molded in the insulating feedthrough.

The plate 16A carries plates 16C that constitute both an electrical contact for the apparatus as a whole and a heat sink for the vacuum bottle.

When the insulating feedthrough 10 is molded, the tube 25 is placed as an insert therein and is thus accurately positioned relative to the insulating material.

Figure 5C:
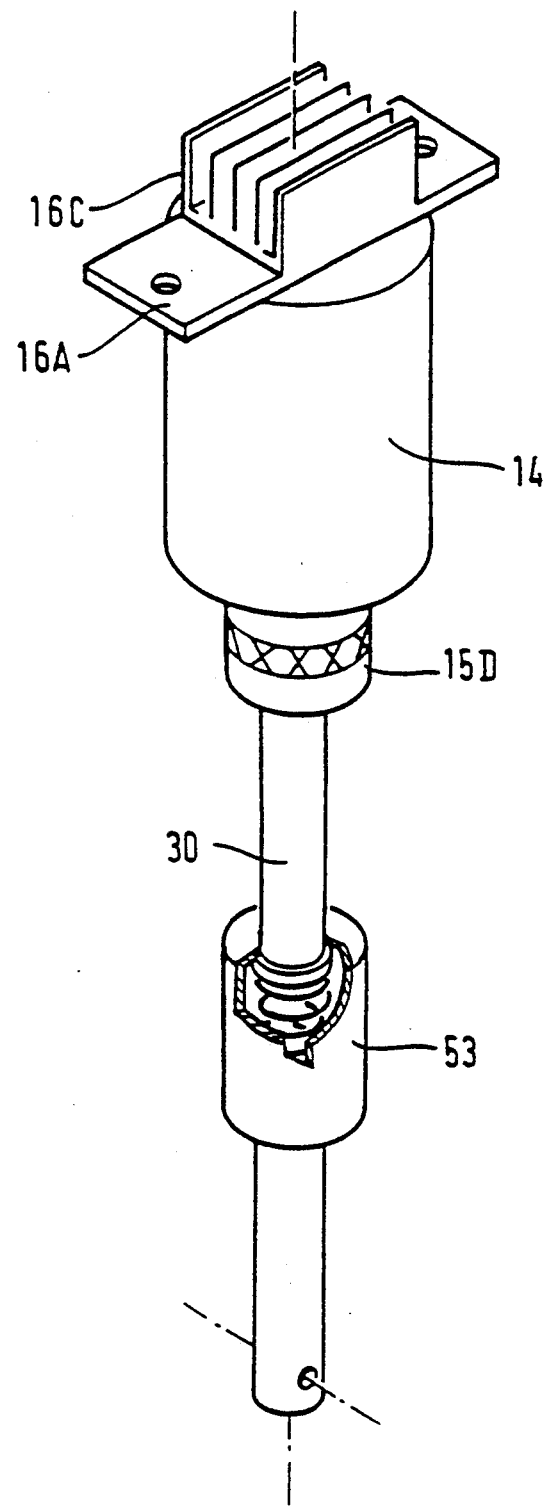
FIG. 5C shows the implementation of a "torch" when assembling a pole of the self-disconnecting circuit-breaker.

To assemble a pole, it is necessary to begin by making a "torch" as shown in FIG. 5C and comprising the vacuum bottle 14, its drive rod 30 screwed to the moving contact of the vacuum bottle, the set of contact springs 15D, the backlash take-up device 53, and the closure plate 16A. This torch is then inserted in the insulating case 10. It then suffices to install the part 26, the lever 32, and the insulating rod 35.

Figure 5D:
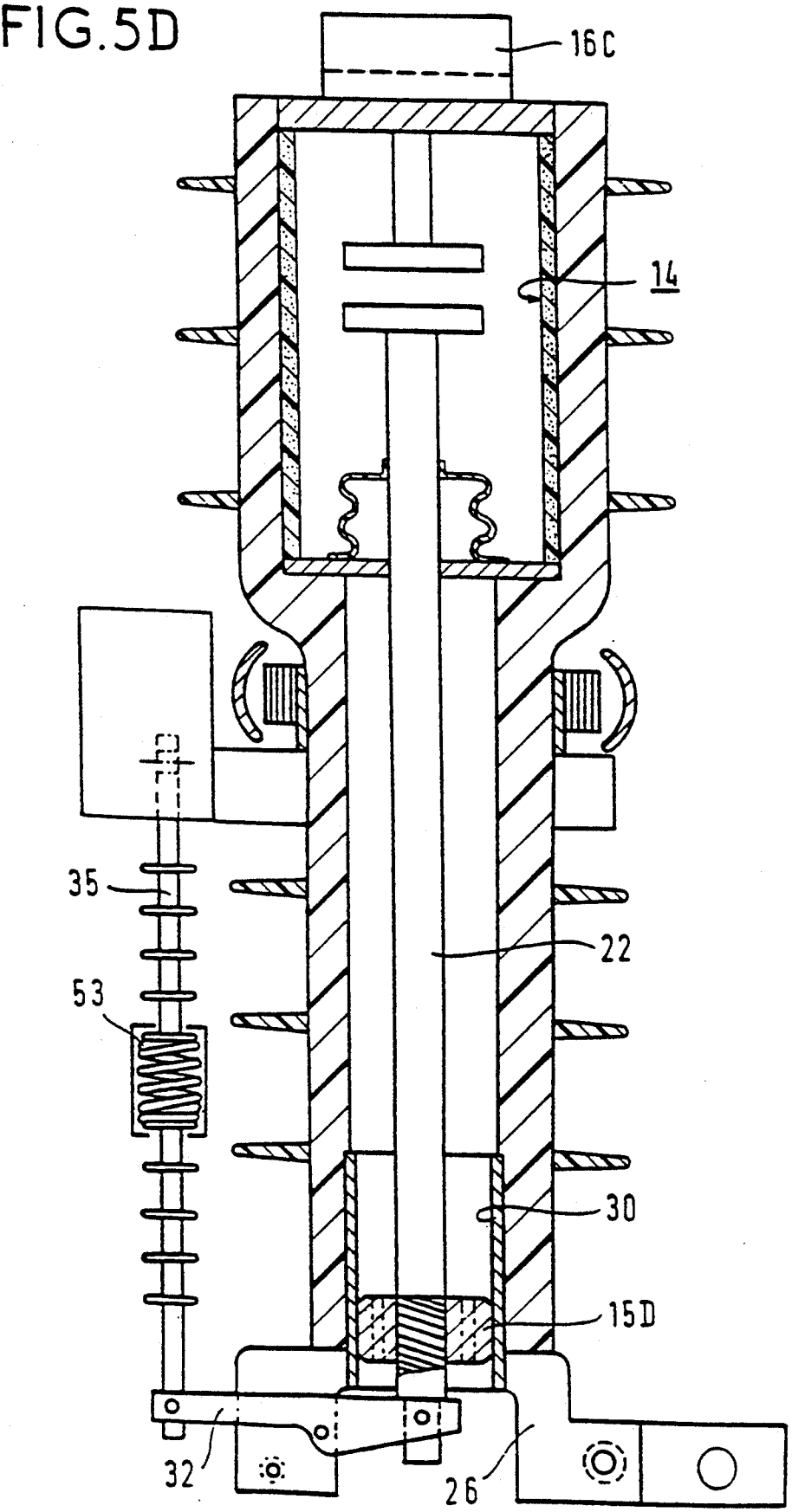
FIG. 5D is an elevation view in axial section of one pole comprising another variant embodiment of the self-disconnecting circuit-breaker.

FIG. 5D shows a variant embodiment. Items that are common to FIG. 5D and to FIGS. 2 and 5B are given the same reference numerals.

The copper tube 30 is short and is placed in the bottom of the portion 10B of the insulating feedthrough. It co-operates with a set of contact springs 15D placed directly on the moving rod 22 of the vacuum bottle. The backlash take-up member 53 is now located in the insulating rod 35.

It may be observed that in a variant the insulating case may be made of ceramic.

In the preceding figures, it has been seen that the vacuum bottles are driven by rotating the control shaft 38. Under such circumstances, the control box 5 is preferably secured to the bar 4. FIG. 5E shows a variant embodiment in which the shaft 38 is driven in translation, and is thus referred to as a push-pull rod. This translation is communicated to each lever 32 in conventional manner, e.g. by means of a lever 32A and a bell crank 38B. Under such circumstances, the control box is advantageously fixed, but it could also be secured to the bar 4.

FIGS. 6 to 9 show how a self-disconnecting circuit-breaker of the invention is assembled for constituting a bay in a medium-tension station.

Figure 6:
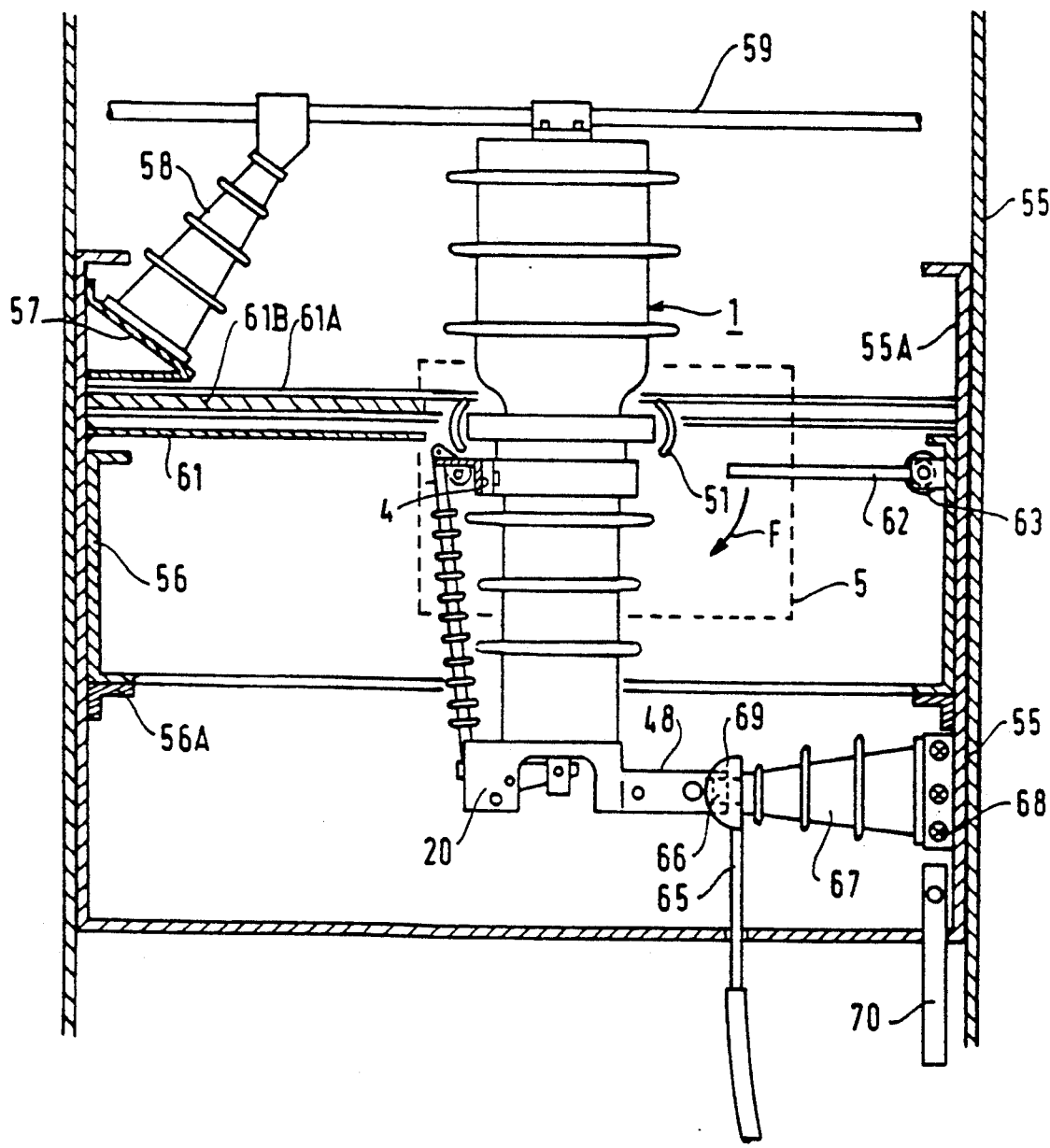
FIG. 6 is an elevation view of an isolating circuit breaker of the invention fitted in its drawer and placed in a chest fixed on a frame, the self-disconnecting circuit-breaker being shown in its operating position.
Figure 7:
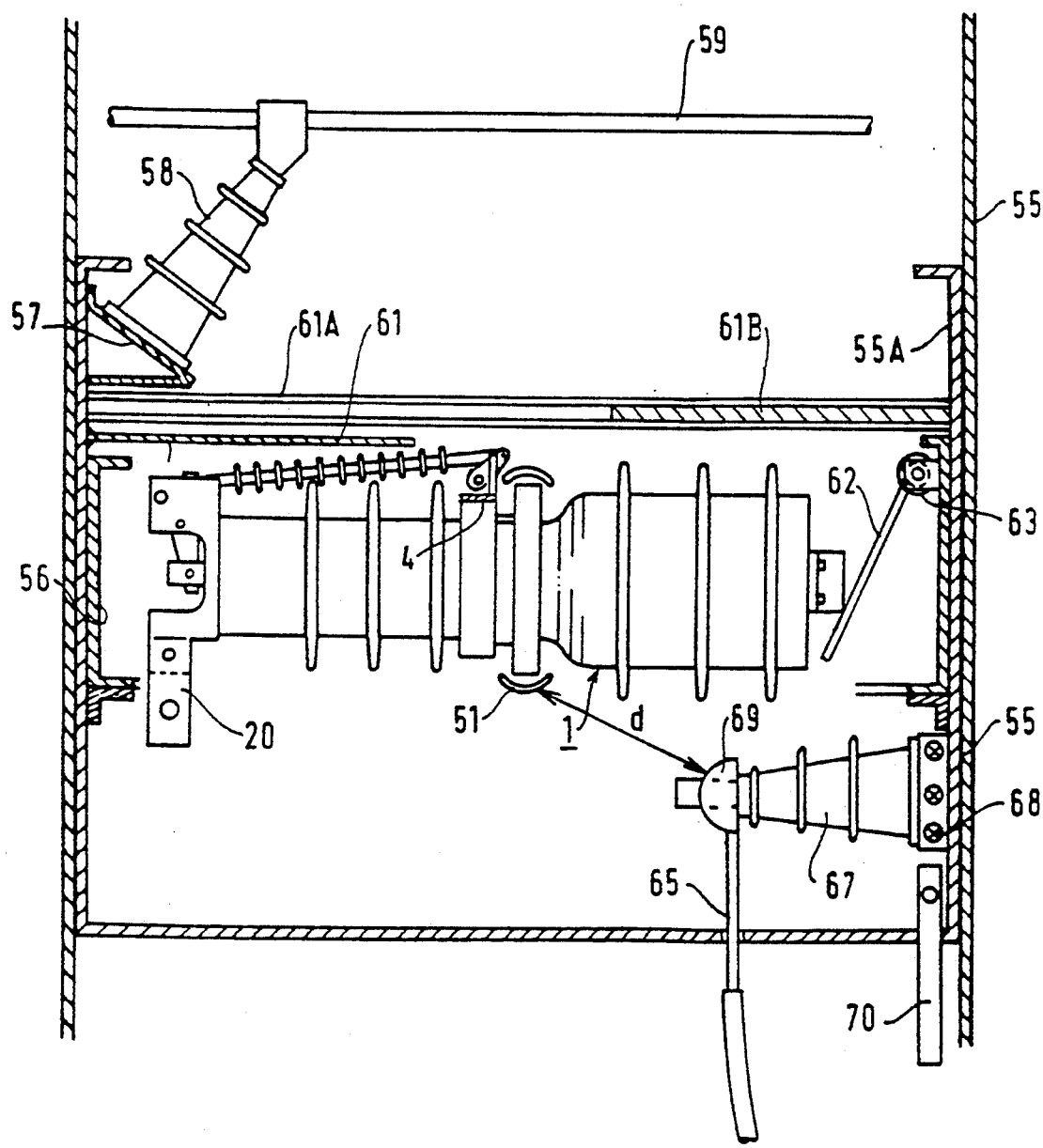
FIG. 7 is a view analogous to FIG. 6, with the self-disconnecting circuit-breaker being shown in its switched off and in disconnecting position.

In FIGS. 6 and 7, there can be seen a metal frame 55 shown in section. The frame is connected to ground potential by conventional means (not shown). The frame has a chest 55A secured thereto by any appropriate means (not shown), which chest contains the self-disconnecting circuit-breaker of the invention together with various items described below. The chest contains firstly a drawer 56 that slides on slideways. The drawer 56 has two opposite faces 56A, FIG. 10, and 56B, FIG. 8, 10, on which the ends of the metal bar 4 are rotatably mounted. It is recalled that this bar is suitable for rotating about its own axis and that it is secured to the control box 5 which is shown in dashed lines in FIG. 6.

The top of the chest carries a bracket 57 on which insulators 58 are mounted that serve as supports for the electrical busbars 59 of the station. The frame is closed at its top by a cover 60, FIG. 8, that prevents access being obtained normally to the bars when the equipment is in operation, but that can easily be removed to provide access to the busbar compartment.

The chest carries a first fixed flap 61 which prevents access to the lefthand portion of the busbar compartment as seen from the front face of the bay. The chest carries slideways 61A carrying a flap 61B which remains to the left of the figure (FIG. 6) when the self-disconnecting circuit-breaker is in normal operation, and which moves automatically towards the right of the figure (FIG. 7) when the self-disconnecting circuit breaker is in its disconnecting position, thereby preventing access to the righthand portion of the busbar compartment from the front face of the bay.

The drawer includes an automatic pivoting shutter 62 subjected to the action of a return spring 63. In normal operation (FIG. 6) said shutter separates the busbar compartment from the cable compartment. During an disconnecting operation, it serves to put the apparatus to ground potential by coming into contact with the jaw terminal 20 and by remaining in contact therewith (see FIG. 7).

At the bottom of the chest, there is a cable compartment in which each outgoing cable 65 is connected to a terminal 66 carried by a respective insulating support 67 that may also be used as a voltage detector, with voltage being detected by means of indicator lamps 68 placed in the bases of the insulating supports 67.

An anticorona screen 69 surrounds the terminal 66 in part.

A blade 70 for each pole serves to ground the terminal 66 when the section switch is open.

The disconnecting function operates as follows:

in normal operation, the self-disconnecting circuit-breaker is in the configuration shown in FIG. 6, with the jaw terminals 20 and 48 being in contact respectively with the busbars 59 and with the terminals 66; and after the circuit-breaker is triggered by control action on the rod 30 (see FIG. 2), the set of poles can be tilted by rotating the metal bar 4 about its own axis in the direction shown by arrow F (FIG. 6). The apparatus then takes up its disconnecting position (FIG. 7) with appropriate isolating distances, in particular with an appropriate distance d between the anticorona devices 51 and 69. The control box 5 tilts simultaneously with the poles which then take up position in the drawer. This disposition makes it possible for isolation to be made visible, thus avoiding any danger to personnel. Isolation can be made even more visible by indicator means constituted, for example, by a line 5A of visible color. A well known device (not shown) makes it possible to remove the drawer completely, thereby preventing access to the busbar compartments. The drawer may be opened far enough (FIG. 8) to provide full access to the poles for maintenance or replacement purposes. It may be observed that the disposition of the poles allows the drawer to be reclosed only when the poles are in the isolating position. Finally, it may be observed that when the drawer is open, the poles of the self-disconnecting circuit-breaker can be moved back into the vertical position by rotating the metal bar 4, e.g. for performing engagement and disengagement tests.

To constitute a complete bay, the frame 55 is placed on a chest 72 for outgoing cables. In addition, a repeater chest 73, FIG. 9, may be placed above the chest 55A with adjustment and display members 74 being disposed in its front face.

It may be observed that the chest 55A containing the drawer with the poles of the self-disconnecting circuit-breaker, the isolators, the ground section switch, and the device for displaying the presence of voltage can be manufactured, inspected, and tested in a factory prior to being installed on site.

It is recalled that the metal bar 4 connected to the control box is at ground potential. Since the poles of the self-disconnecting circuit-breaker are mounted on this common bar, any risk of arcing between phases is practically nil.

The current sensors provided on the poles serve to detect an abnormal overload or short circuit current flowing through a pole and to cause the circuit-breaker to be operated. The direct action maximum current relay which does not require an auxiliary energy source may be installed in the control box 5. In the event of the feedthrough dielectric breaking down level with the metal bar, the current detector detects a ground fault and triggers disengagement.

Section switching or disconnecting by rotating the metal bar 4 secured to the control box is normally under motor control, but it may also be performed manually.

FIG. 10 shows how the section switch function of the self-disconnecting circuit-breaker of the invention can be motorized.

In FIG. 10, there can be seen the metal bar 4, the control shaft 38 for the poles of the circuit-breaker and one of the cranks 37. The corresponding pole is not shown in order to clarify the drawing.

The bar 4 is held by two ball bearings 75 and 76 secured respectively to the walls 56A and 56B of the drawer. The control box is secured to the bar 4, e.g. by welding. A gear wheel 77 is secured to the bar 4. A motor 78 fixed to the wall 56A of the drawer drives the gear wheel 77 via a speed reducing helical gear 79, thereby rotating the bar 4 and the box 5 independently of movement of the control shaft 38. Motorizing the above-described section switching or disconnecting shows that the apparatus can be remotely controlled and thus that it can be used for fitting to stations that do not usually have operating or surveillance personnel.

Figure 10A:
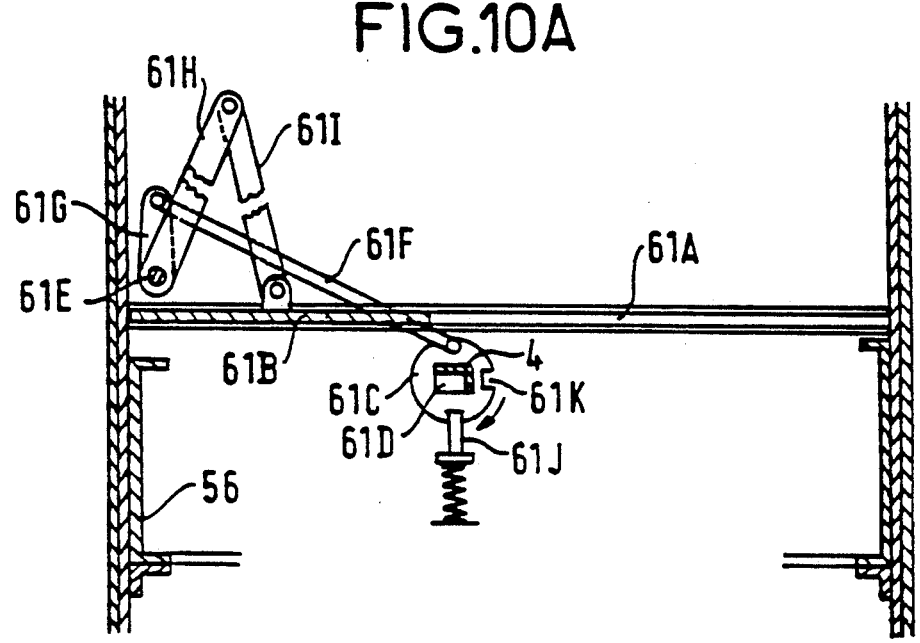
FIG. 10A is a side view of the sliding protective flap and of its drive mechanism.
Figure 10B:
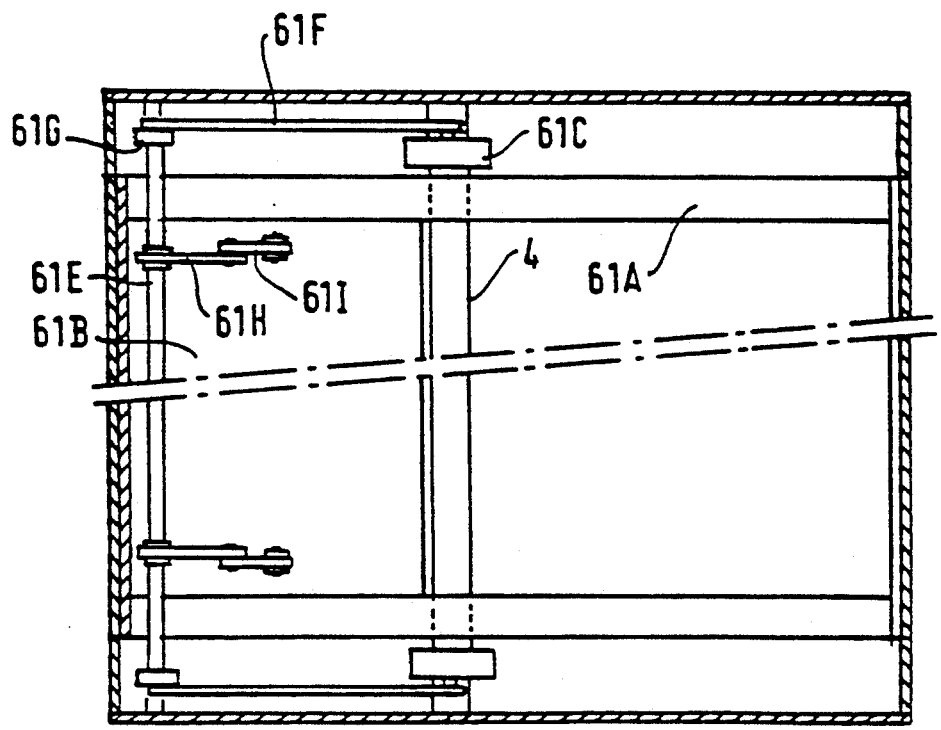
FIG. 10B is a plan view of the same mechanism.

FIGS. 10A and 10B show an embodiment of a mechanism for automatically driving the flap 61B, shown by way of non-limiting example.

As already mentioned, the chest carries two slideways 61A in which the flap 61B in the form of a rectangular metal sheet can slide.

On its rear face, the chest carries a moving disk 61C having a central hole 61D of appropriate shape for receiving the bar 4 which projects from the drawer beyond its face 56B (see FIG. 10) and which enables the disk to be rotated when the pole-supporting bar 4 rotates about its own axis when performing a section switching operation. When the bar is an angle section bar, as mentioned above, the hole is advantageously square or rectangular in shape. The flap is moved in translation by rotation of the disk by means of two linkages co-operating with a shaft 61E parallel to the plane of the flap and parallel to the bar 4. The shaft is fixed to the chest 55A by means of bearings, not shown. It is rotated by a connecting rod 61F hinged at one end to the disk 61C and at the other end to a crank 61G secured to the shaft 61E. Rotation of the shaft is converted into translation which is communicated to the flap by means of the two linkages. Only one of the linkages is described in detail, namely the linkage at the back of the drawer, the other linkage, at the front of the drawer is entirely identical. The first linkage comprises a link 61H secured to the shaft 61E and hinged to a crank 61I which is hinged to the flap. During a section switching operation, the support bar 4 engaged in the hole in the disk 61C is rotated in the direction of arrow F. Rotation of the disk 61C rotates the shaft 61E, and the crank shaft and connecting rod assembly 61H–61I causes the flap 61B to move in translation, thereby preventing access to the righthand portion of the busbar compartment. After a section switching operation, if the drawer 56 is pulled out, a locking catch 61J engages in a notch 61K in the disk 61C, thereby holding the flap 61B in position. The catch is provided with a spring and it disengages when the drawer is pushed back in.

FIGS. 10C and 10D show a variant embodiment of the protective flap.

FIG. 10C shows two superposed parallel flaps given respective overall references 61L and 61R. The flap 61L comprises a first portion having three rectangular pieces 61L1, 61L2, and 61L3, each provided with a notch, and connected together by an elongate piece 61M having oblong slots 61N. The flap 61L further comprises a second portion having three pieces 61L1', 61L2', and 61L3', each provided with a notch, and connected together by an elongate piece 61m' provided with studs 61P on either side of said piece and engaging in the slots 61N. The pieces 61L and 61M are urged towards each other by springs such as 61O. The notches define openings that fit round the peripheries of the poles when the poles are in their engaged position, thereby separating the cable portion of the bay from the busbar portion thereof.

The flap 61R comprises a first portion having three rectangular pieces 61R1, 61R2, and 61R3 that are connected together by an elongate portion (no reference) provided with elongate slots, and a second portion 61R1'-61R2'-61R3' connected together by an elongate piece (no reference) provided with oblong slots engaging on the studs 61P. The first and second portions are urged towards each other by a spring 61S.

When the self-disconnecting circuit-breaker is in its disengaged and section-isolating position, the flap 61R separates the cable compartment from the busbar compartment of the bay.

The flaps 61L and 61R are driven either by the poles themselves which carry spurs such as the spurs 61T, or else by a mechanism of the type described with reference to FIGS. 10A and 10B.

Figure 11:
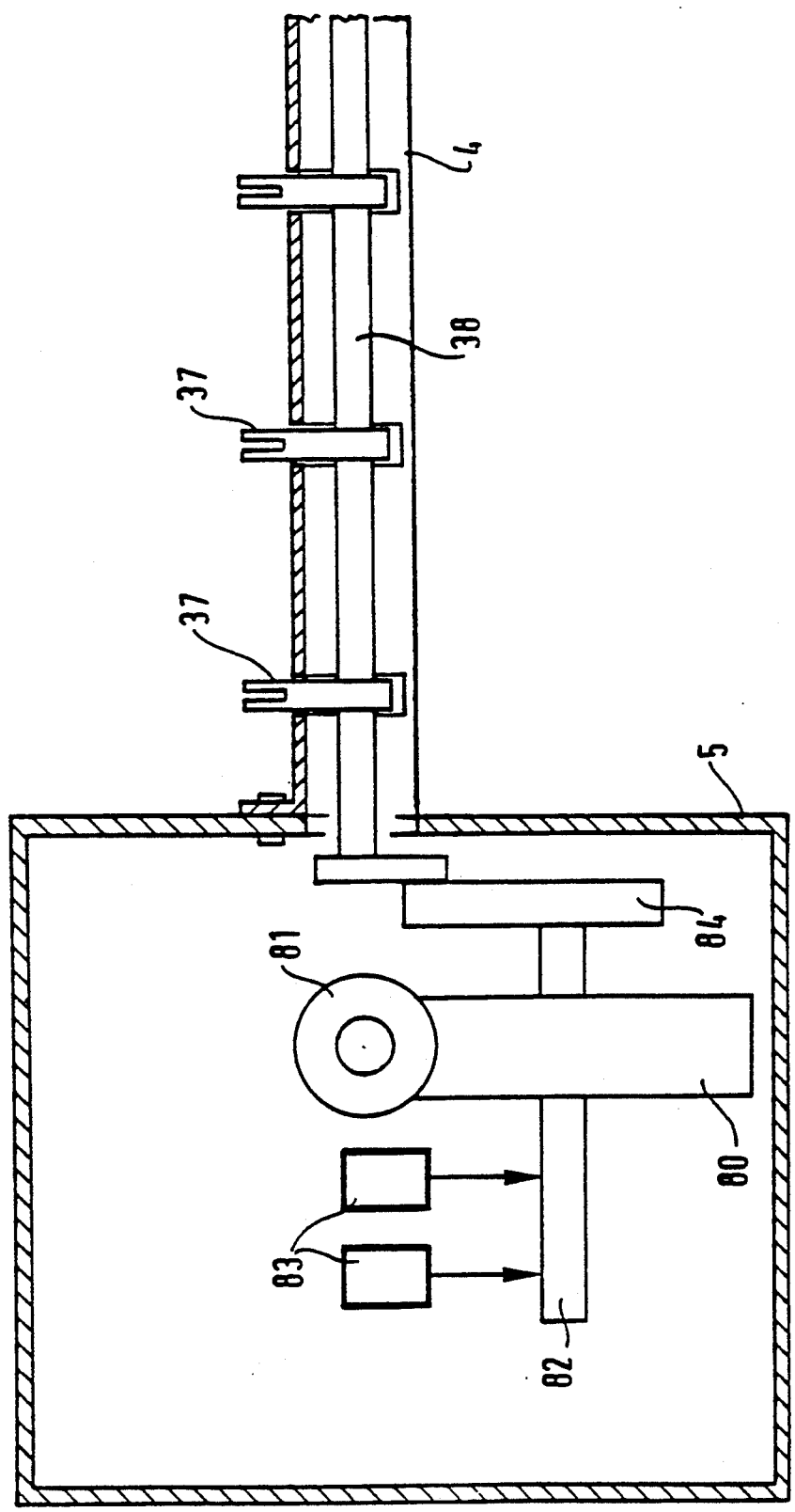
FIG. 11 is a diagram for use in explaining the mechanism that drives the circuit breaking portion of the self-disconnecting circuit-breaker of the invention.

In addition to the above-mentioned maximum current relay, the box 5 also contains all the mechanism for rotating the control shaft 38, suitable for enabling opening and closing cycles to be performed by the circuit-breaker portion of the self-disconnecting circuit-breaker of the invention. FIG. 11 is a diagram showing how this mechanism operates, which mechanism has the advantage of being directly connected to the control shaft 38 of the self-disconnecting circuit-breaker. It suffices to describe the principles under which the mechanism operates since implementing it is within the competence of the person skilled in the art who may usefully refer to an article entitled "Appareillage electrique d'interruption a haute tension" by Eugene Maury at page 49 of "Technique de l' Ingenieur", D 657-4.

In FIG. 11, there can be seen the shaft 38 disposed inside the bar 4 which is secured to the control box 5.

The mechanism comprises a drum 80 fitted with a spring which constitutes a store of drive energy. A motor and stepdown gear chest unit 81 serves to drive the drum so as to store energy in the spring. The drum rotates a shaft 82 which always rotates in the same direction when the spring relaxes. This shaft is associated with coupling devices 83 under electrical or manual control and enabling the usual opening and closing cycles to be performed (e.g. a cycle: open, 0.1 s, close, open). An eccentric 84 serves to transform the one-way rotation of the shaft 82 into back-and-forth circular motion which is communicated to the control shaft 38 for the poles of the self-disconnecting circuit-breaker.

Figure 8:
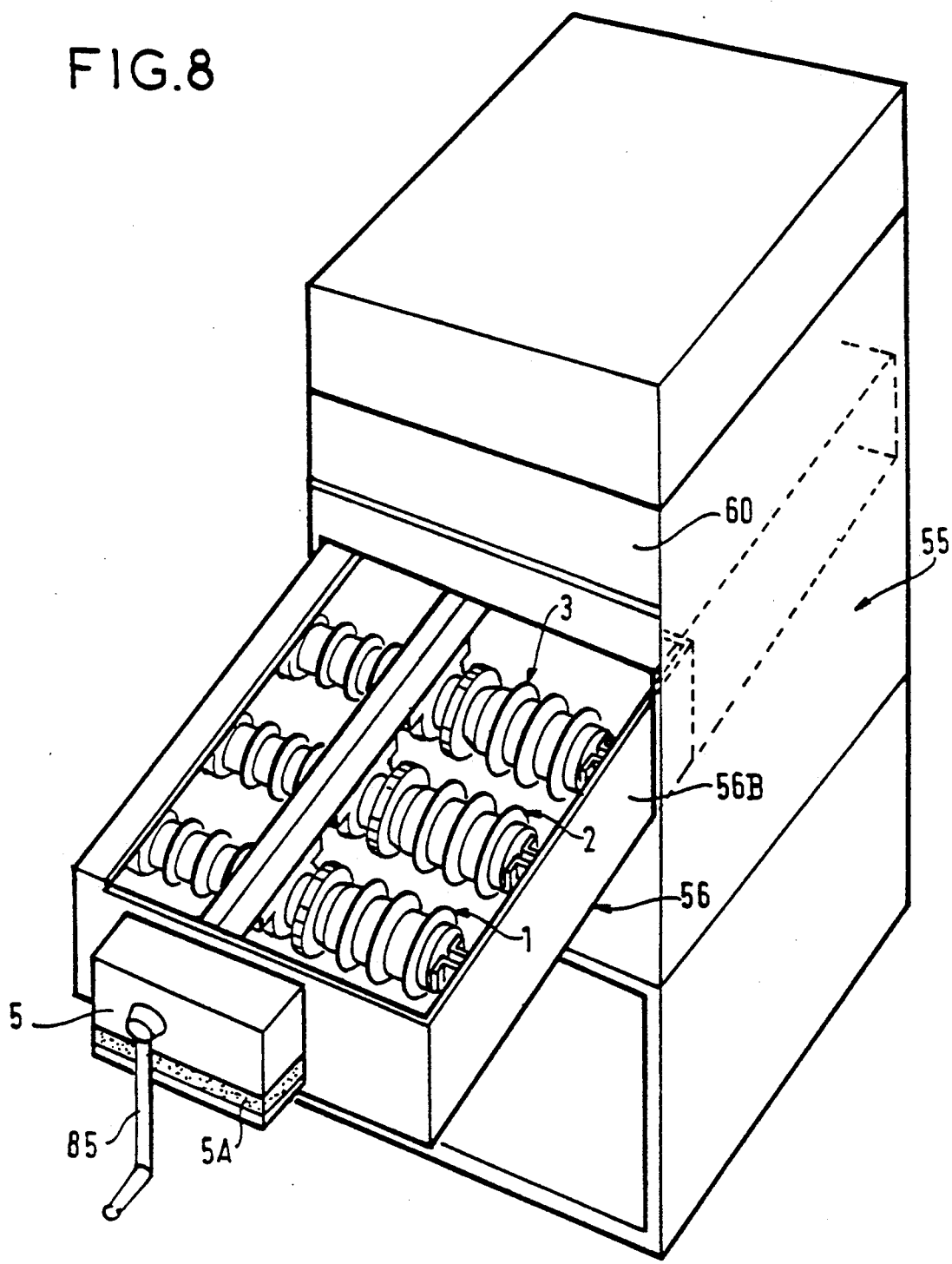
FIG. 8 is a diagrammatic perspective view of a bay, with its drawer open.
Figure 9:
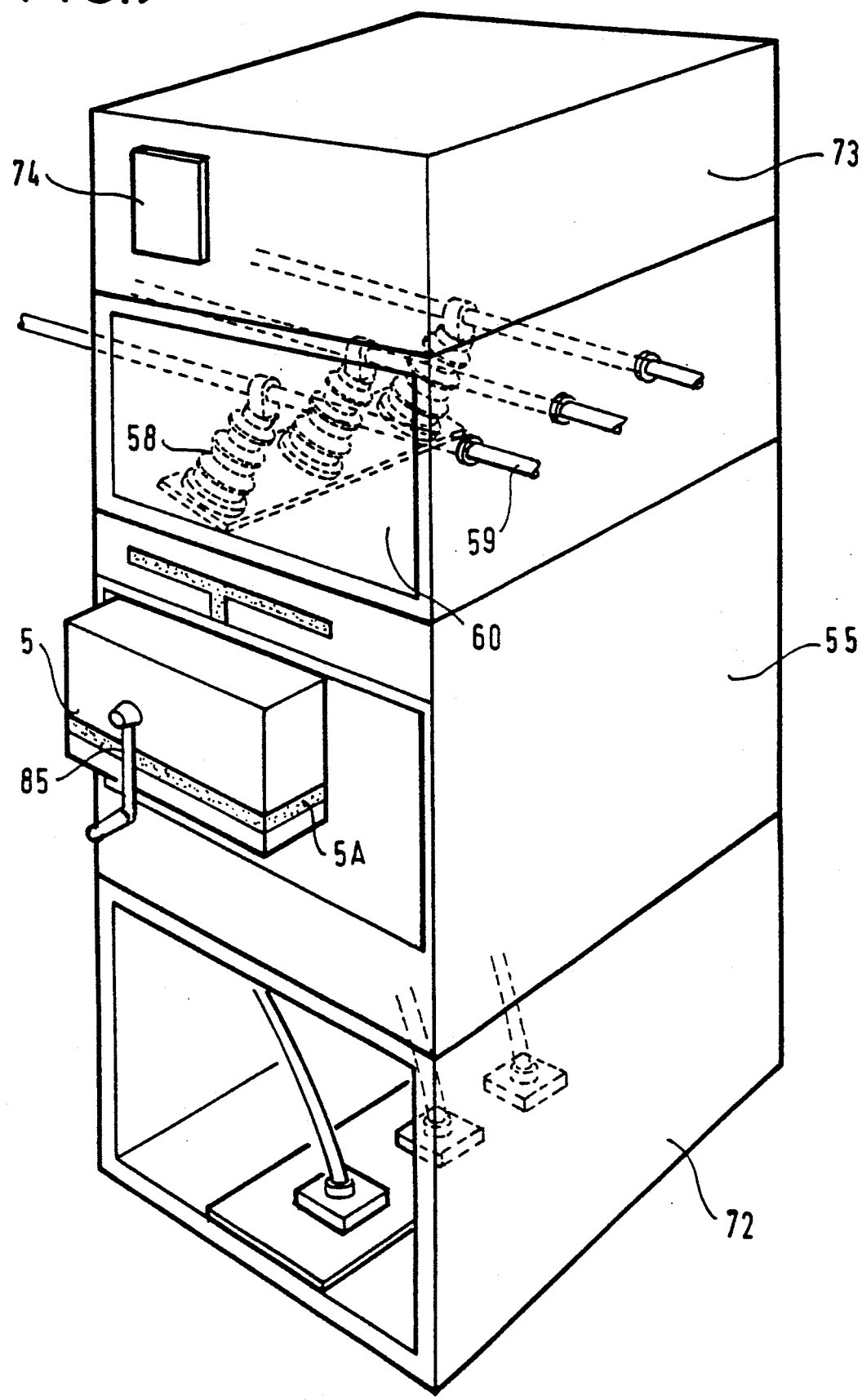
FIG. 9 is a view of the same bay with the drawer closed.

In well known manner, the mechanism includes a manual resetting mechanism including a lever 85 that can be seen in FIGS. 1, 8, and 9.

In the embodiment of the self-disconnecting circuit-breaker described with reference to FIGS. 6 to 9, there can be seen a conventional bay including all of the items required for medium tension power supply from a set of busbars. Typically the nominal voltage is 36 kV and the nominal current is 1250 A.

Other applications of the self-disconnecting circuit-breaker of the invention are described below.

Figure 12:
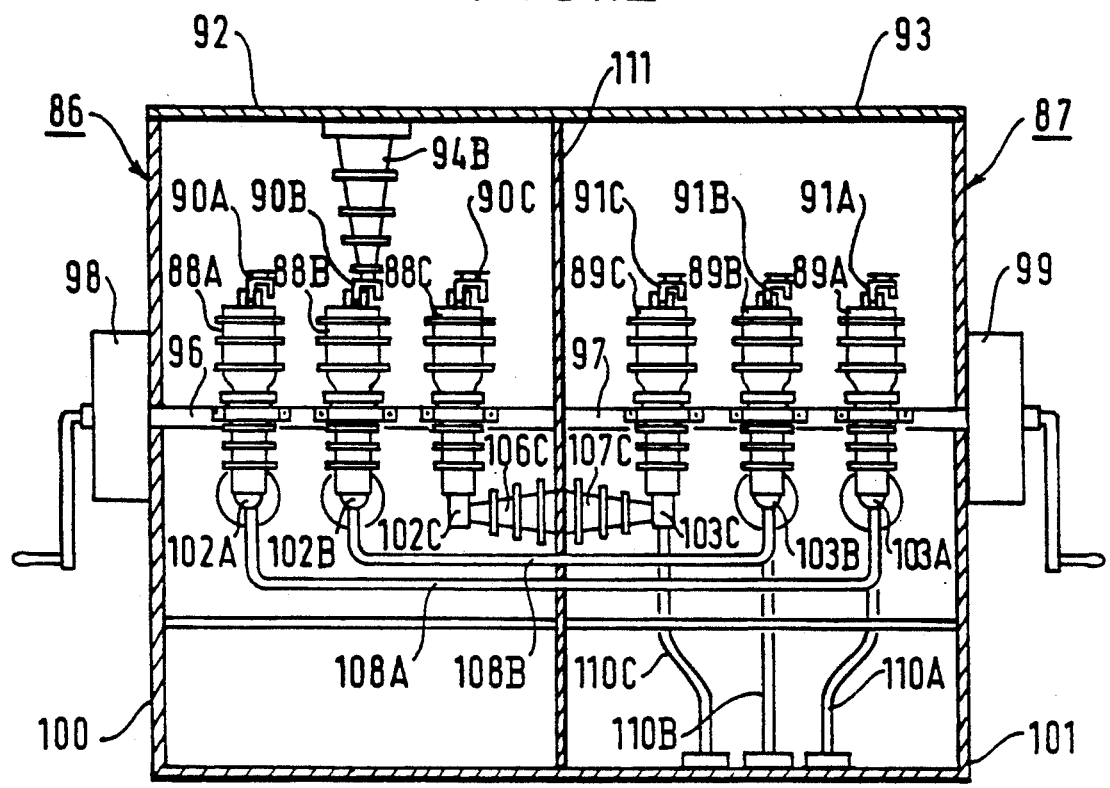
FIG. 12 is an elevation view showing one side of a bay having two sets of busbars, and an outlet making use of two self-disconnecting circuit-breakers of the invention.

FIG. 12 is a side elevation view of a bay having two sets of busbars and one outlet, using two self-disconnecting circuit breakers of the invention. The lateral partition of the bay has been removed to show the inside of the bay more clearly.

The bay comprises two chests 86 and 87 mounted back to back and each including two self-disconnecting circuit-breakers whose poles are respectively referenced 88A, 88B, 88C, and 89A, 89B, 89C. The busbars 90A, 90B, 90C for the chest 86 and 91A, 91B, 91C for the chest 87 are carried by respective covers 92 and 93 of the bays 86 and 87, by means of insulators, with only one insulator 94B being shown in order to clarify the drawing.

In the chests, the poles are carried by bars 96 and 97 identical to the bars 4 of the preceding figures, and connected to respective control boxes 98 and 99.

The chests stand on cable chests 100 and 101, one of which is empty since there is only one outlet.

Bottom terminals 102A, 102B, 102C, and 103A, 103B, 103C are carried by insulators fixed to the walls of the chests. Only insulators 106C and 107C are shown in the drawings.

The bottom terminals are connected in pairs by busbars such as 108A and 108B.

The terminals 103A, 103B, and 103C have respective outgoing cables 110A, 110B, and 110C connected thereto.

A fire-break partition 111 may optionally be disposed between the two sets 86, 100 and 87, 101.

The bay of FIG. 12 uses two self-disconnecting circuit-breakers of the invention instead of two section switches and one circuit-breaker as used in the prior art. By using self-disconnecting circuit-breakers of the invention, each of which performs the functions of interruption, switching, and isolation, it is possible to eliminate all of the complicated interlocks that are normally required, and it is possible to provide stations having two sets of busbars that are completely under remote control.

It can be seen that the standard chest described above thus makes it easy to provide a bay with two sets of busbars and one outlet. Naturally this example is not limiting, and numerous circuit diagrams can be implemented.

The example of FIG. 12 typically concerns a bay for a voltage of 36 kV and a nominal current of 1250 A. For a nominal current of 2500 A, each pole may have two self-disconnecting circuit-breakers in parallel, as shown in FIG. 13.

Figure 13:
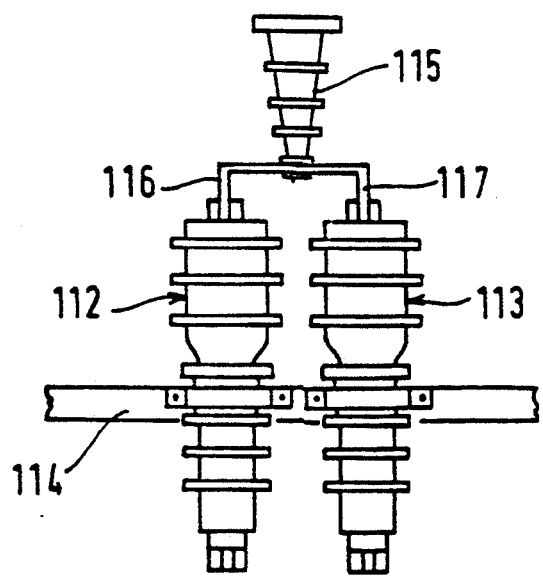
FIG. 13 shows two poles of the invention associated in parallel for doubling current-carrying capacity.

In FIG. 13, there can be seen two poles 112 and 113 mounted on the same bar 114. The same busbar insulator 115 carries a busbar having two branches 116 and 117 in a U configuration.

It may be observed that the two current transformers of the two poles are present side by side and serve to balance the currents.

Figure 14:
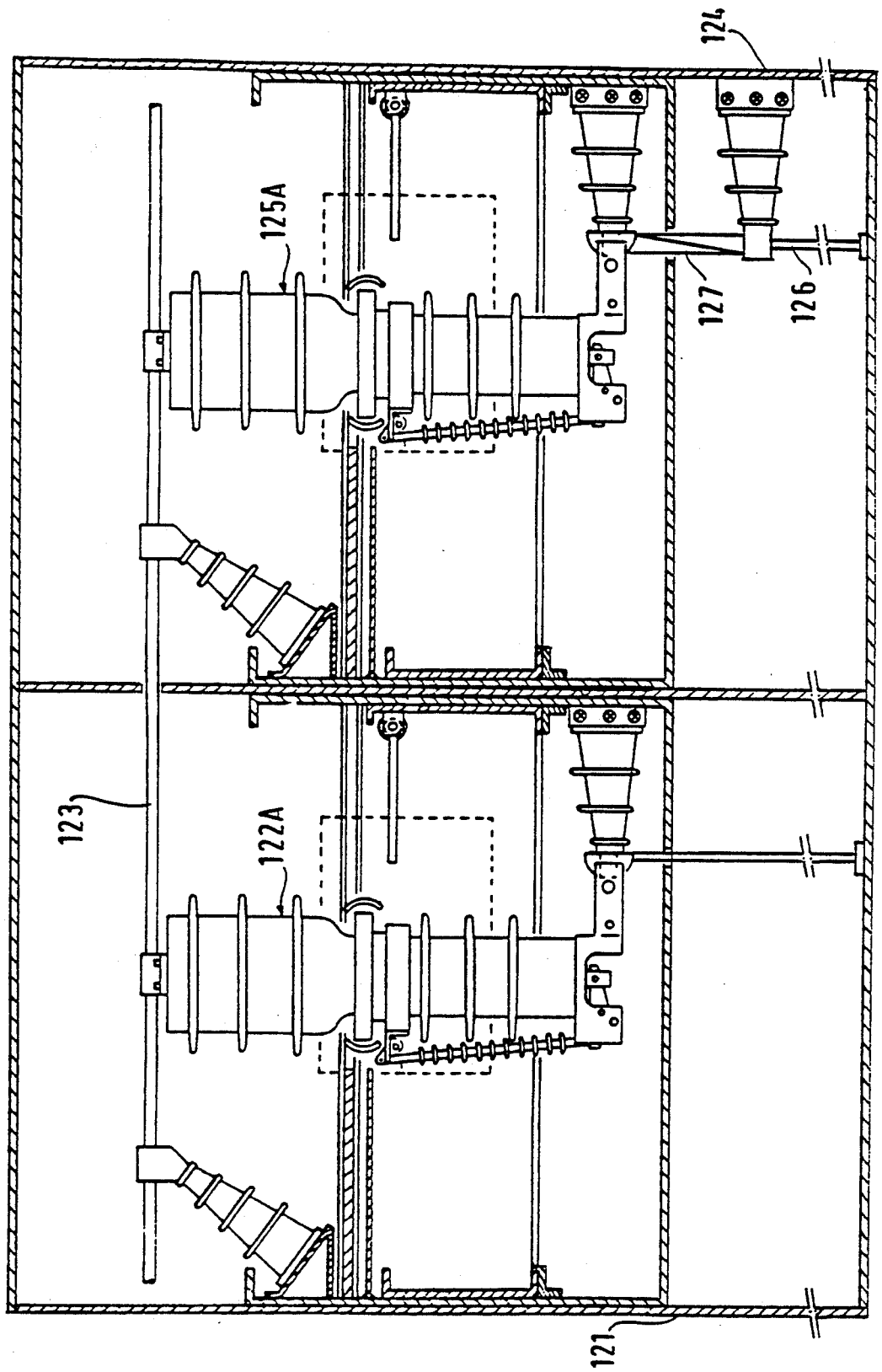
FIG. 14 shows a protective bay for a motor made using a self-disconnecting circuit-breaker of the invention, and coupled to a bay of the type shown in FIG. 7.

Another use is shown in FIG. 14 and relates to an assembly for protecting and starting a motor.

This assembly comprises a circuit-breaker bay 121 of the type shown in FIG. 7 and including a three-pole self-disconnecting circuit-breaker of which only the pole 122A is visible in the figure. The set of busbars is referenced 123.

A second bay 124 placed adjacent to the bay 121 uses the same set of busbars 123, and contains a self-disconnecting circuit breaker of the invention fitted with contactor type vacuum bottles, i.e. bottles having low nominal currents but capable of performing a large number of operations. The figure shows one pole 125A of said apparatus used as a self-disconnecting contactor, for actuating a motor powered by a cable 126 and protected by a fuse 127. Naturally, in the bay 124, the spring control of the apparatus is replaced by an industrial contactor motor operating at low voltage and connected directly to the drive rod of the isolating contactor with or without latching. The width of the assembly shown in FIG. 14 is considerably smaller than that of equivalent prior art assemblies. For example, for a 7 kV bay, the bay may have a total width of about 350 mm.

In general, bays made by means of the self-disconnecting circuit breaker of the invention occupy a smaller ground area than required by prior art bays that perform the same functions.

Thus, in the prior art, the depth of a cell comprises the sum of the following:

the space that must be left between the wall and the bay per se in order to give access to the busbars or to the cables;

the depth of the portion containing the set of busbars, the outgoing cables, and the section switches; and room for the unpluggable circuit-breaker.

The self-disconnecting circuit-breaker of the invention makes it possible to provide a bay that is backed up against a wall and that occupies reduced ground area.

In the prior art, the total width of a three-phase bay is not less than 3P+4d, where P is the width of one pole and d is the distance in air between two poles. This distance can be reduced only by putting insulation between the poles, but that increases the cost of the bay and suffers from the drawback that such insulation is subject to aging and must be monitored and changed, if necessary.

The width of a bay including self-disconnecting circuit-breakers of the invention is equal to P'+2d, where P' is the width of one pole and is in any case less than P.

The invention makes it possible to simplify medium-tension protective bays quite considerably.

Figure 15:
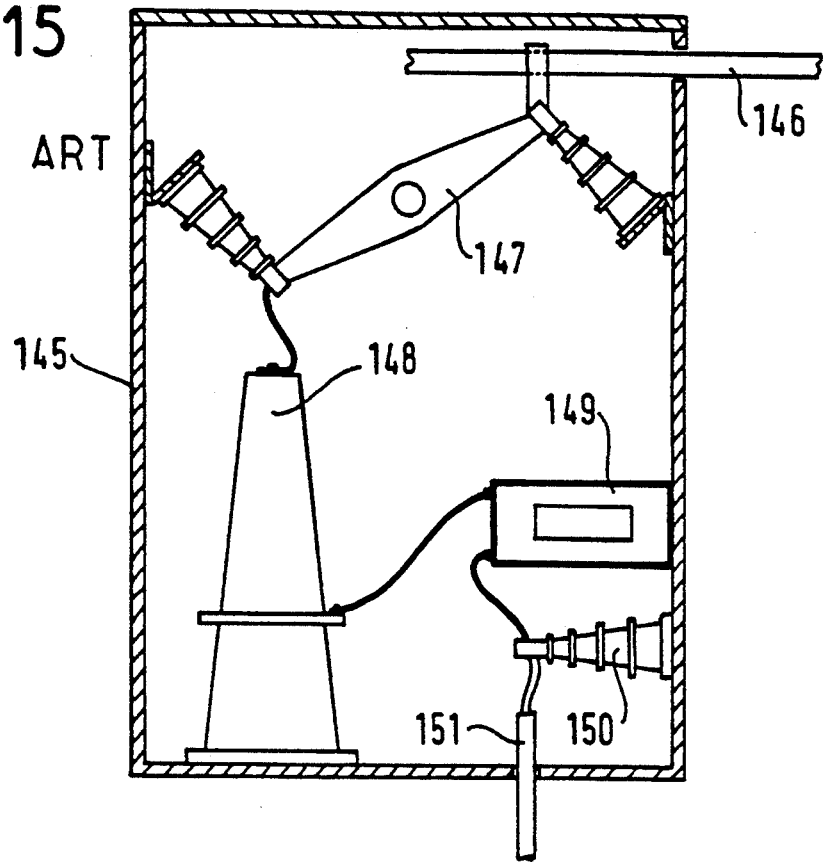
FIG. 15 shows a conventional cable-protecting bay.

One example concerns making a protective bay for an outlet circuit-breaker. FIG. 15 is a diagram of a prior art bay 145 for protecting cables, whereas FIG. 16 shows a bay 152 which is modified by using an isolating circuit-breaker of the invention.

In FIG. 15, the bay 145 includes a set of busbars 146, a section switch 147, a circuit-breaker 148, a current transformer 149, and an insulating support 150 to which the cable 151 is connected.

Figure 16:
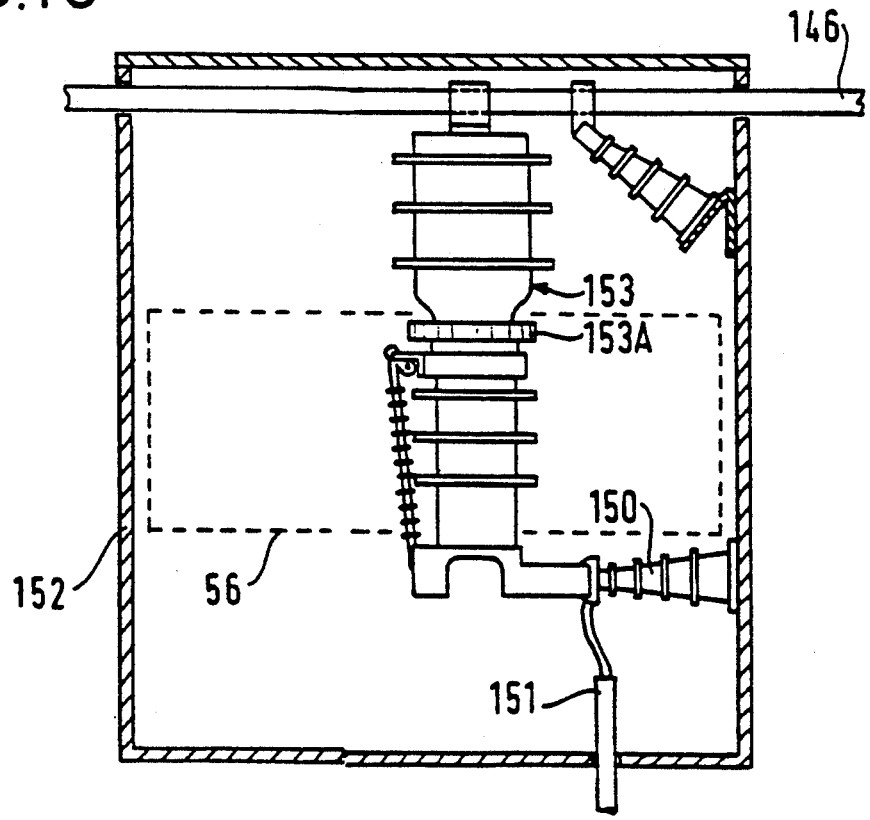
FIG. 16 shows a cable-protecting bay made using a self-disconnecting circuit-breaker of the invention.

In FIG. 16, where items in common with FIG. 15 are given the same reference numerals, the section switch, the circuit-breaker, and the current transformer are all replaced by an isolating circuit-breaker 153 which has its own current sensor 153A.

It may be observed that the width of the bay 152 is less than the width of the prior art bay 145. As to depth, it is shown above that the depth of the bay including the self-disconnecting circuit-breaker of the invention is less than that of the prior art bay.

Another example is that of a bay for providing general protection in a medium-tension/low-tension subscriber station.

Figure 17:
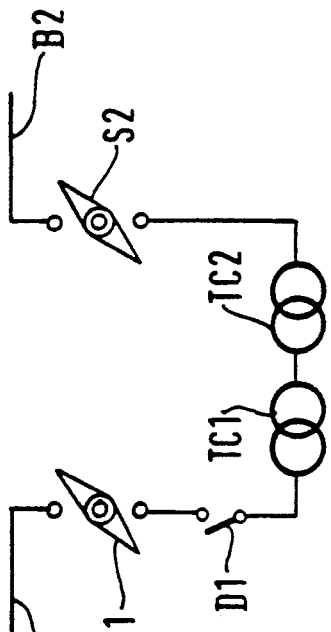
FIG. 17 is a circuit diagram of a prior art general protection bay for a medium-tension/low-tension subscriber station.

The circuit diagram of such a bay is given in FIG. 17.

The bay comprises a set of busbars B1, a first section switch S1, a circuit-breaker D1, a first current transformer TC1 for protection purposes, a second current transformer TC2 for metering purposes, a second section switch S2, and a second set of busbars B2.

That bay is bulky and requires an auxiliary power source for triggering the circuit-breaker.

Figure 18:
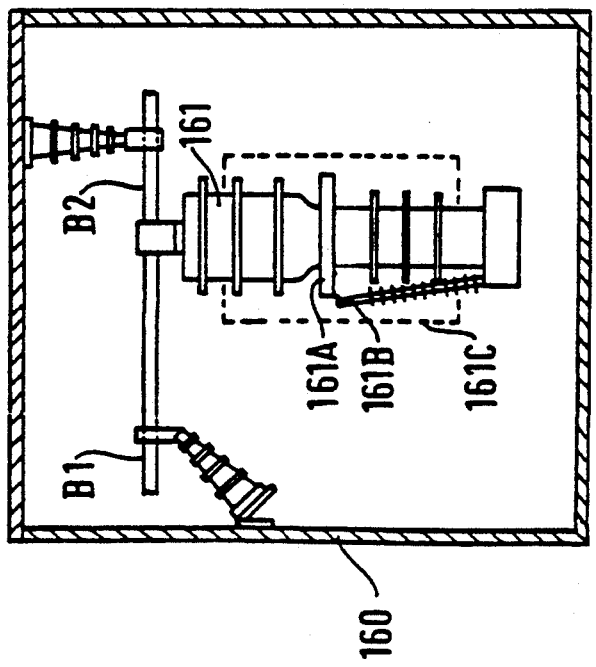
FIG. 18 is a front view of a general protection bay for a medium-tension/low-tension subscriber station using a self-disconnecting circuit-breaker of the invention.
Figure 19:
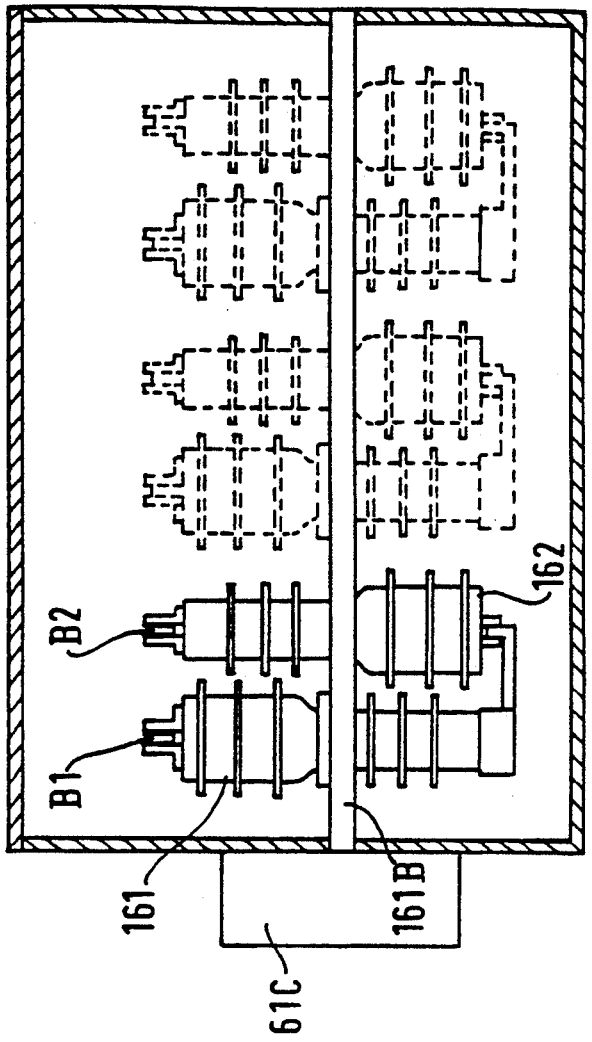
FIG. 19 is a side view of the same bay.

FIGS. 18 and 19 show a bay performing the same functions, but by means of an isolating circuit-breaker of the invention 161 that includes its own current transformer 161A that acts as the transformer TC1 for triggering the circuit breaker on a fault. The disconnecting circuit-breaker 161 is carried by its support bar 161B secured to the control box 161C.

For each pole, the bar also carries a current transformer 162 for metering purposes. This transformer has the special feature of having substantially the same outside shape as a pole of the self-disconnecting circuit-breaker. It is mounted head to tail with the corresponding pole, so as to take up minimum space, and it is connected in series with the pole.

The outlines of the other two poles in the bay together with their corresponding metering transformers are drawn using dashed lines.

The metering transformer and self-disconnecting circuit-breaker assembly can be placed in a drawer as shown in a preceding example. It can consequently be pulled out.

It can be seen that the bay of FIGS. 18 and 19 does indeed include all of the functions of a conventional bay, but that it has the advantage of occupying less ground area and that it can be implemented at lower cost.

Figure 20:
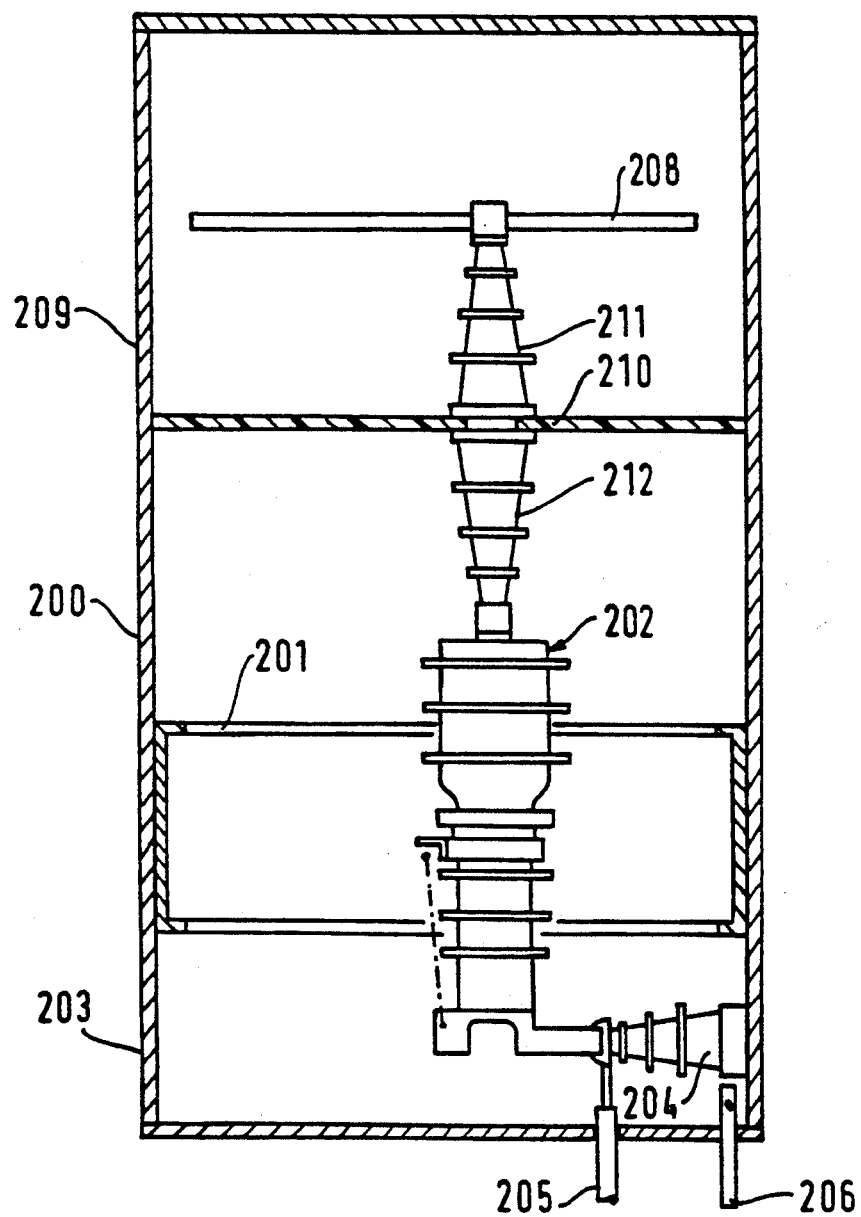
FIG. 20 is a front elevation view of a bay specially designed for protecting a set of busbars against the risks of arcs propagating, and including a self-disconnecting circuit-breaker of the invention.

FIG. 20 shows a variant embodiment of a bay made using a self-disconnecting circuit-breaker of the invention. This bay is designed to protect the sets of busbars against any risk of arc propagation.

To this end, the bay comprises a cabinet 200 slidably receiving a drawer 201 containing the poles 202 of the self-disconnecting circuit-breaker, the bay also containing a cable compartment 203 housing, in particular, the isolating supports 204 for the cables and for the ground section switch 206.

The set of busbars 208 is placed in a compartment 209 that is separated from the cabinet by an anti-arcing wall 210. Current is conveyed by means of feedthroughs 211 and 212 fixed to the wall 210.

The bay made in this way satisfies the most stringent tests (PELLA tests) and, because of its design and because it uses self-disconnecting circuit-breakers of the invention, said bay is of reduced sensitivity to faults between phases.

It has been mentioned that the self-disconnecting circuit-breaker of the invention is suitable for use at a tension of 36 kV.

By connecting two vacuum bottles in series in the same pole feedthrough, it is possible to double the operating voltage of the assembly or to double the current interrupting power of the circuit-breaker.

Figure 21:
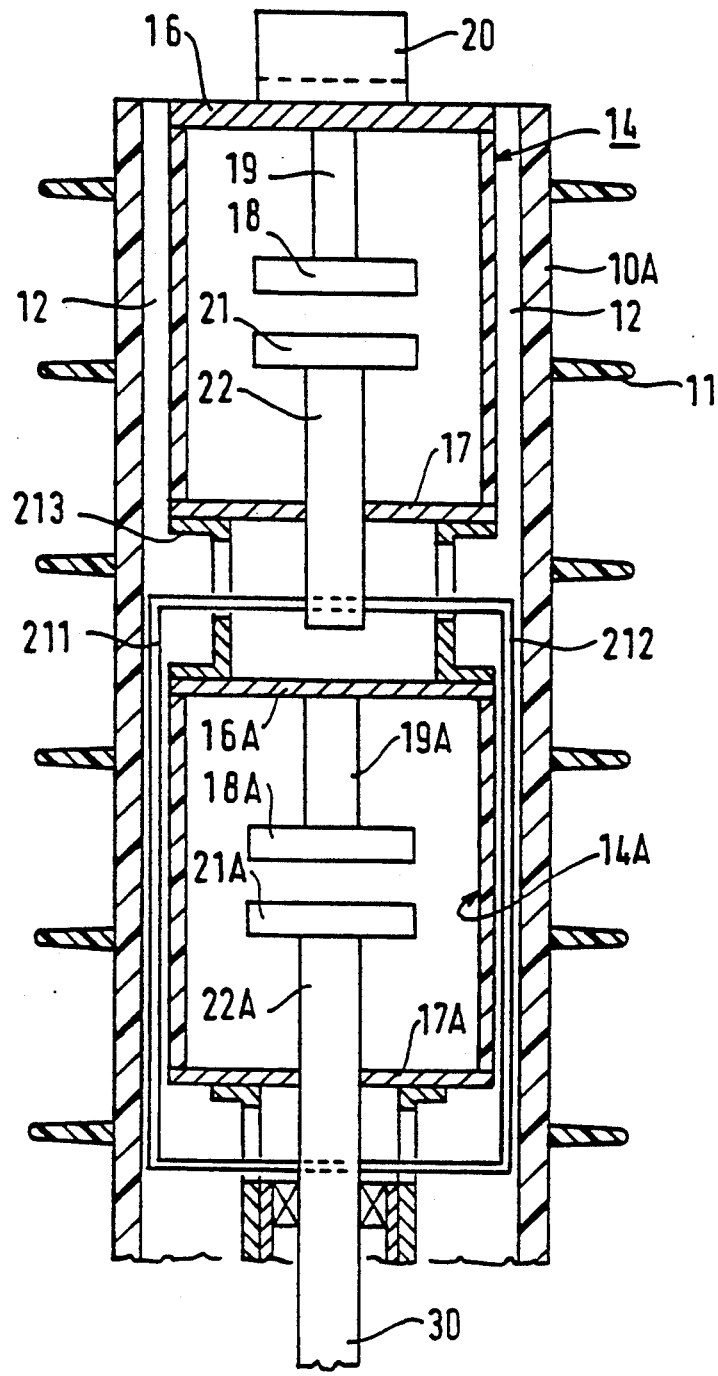
FIG. 21 is an axial section view through a portion of the feedthrough for one pole in a self-disconnecting circuit-breaker constituting a variant embodiment of the invention that makes use of two vacuum bottles per pole.

FIG. 21 shows an implementation of this idea and in particular it shows the top portion of the feedthrough for one pole of a self-disconnecting circuit-breaker that has two vacuum bottles. The references used are the same as in FIG. 2.

The case 10A contains two vacuum bottles 14 and 14A. The components of the bottle 14A that correspond to components of the bottle 14 are given the same reference numerals plus the letter A.

The moving rod 22 of the bottle 14 is connected by brackets 211 and 212 to the moving rod 22A of the bottle 14A. Advantageously, these brackets lie in the grooves 12 of the case 10A.

The bottles 14 and 14A are connected electrically in series by metal jumpers 213 welded firstly to the endplate 17 of the bottle 14 and secondly to the endplate 16A of the bottle 14A.

The above disposition makes it possible to provide a self-disconnecting circuit-breaker operable up to 72 kV, and such apparatuses may be used, in particular, for replacing very large volume oil circuit-breakers.

It may be observed that in some cases, the space in the grooves 12 may be filled with an insulating liquid or with sulfur hexafluoride $SF_6$ to improve voltage distribution along the assembly. Sealing precautions then need to be taken but such precautions are well known to the person skilled in the art.

The bay shown in FIG. 7 may be arranged so as to enable the conventional functions of a shunt circuit-breaker to be performed.

Figure 22:
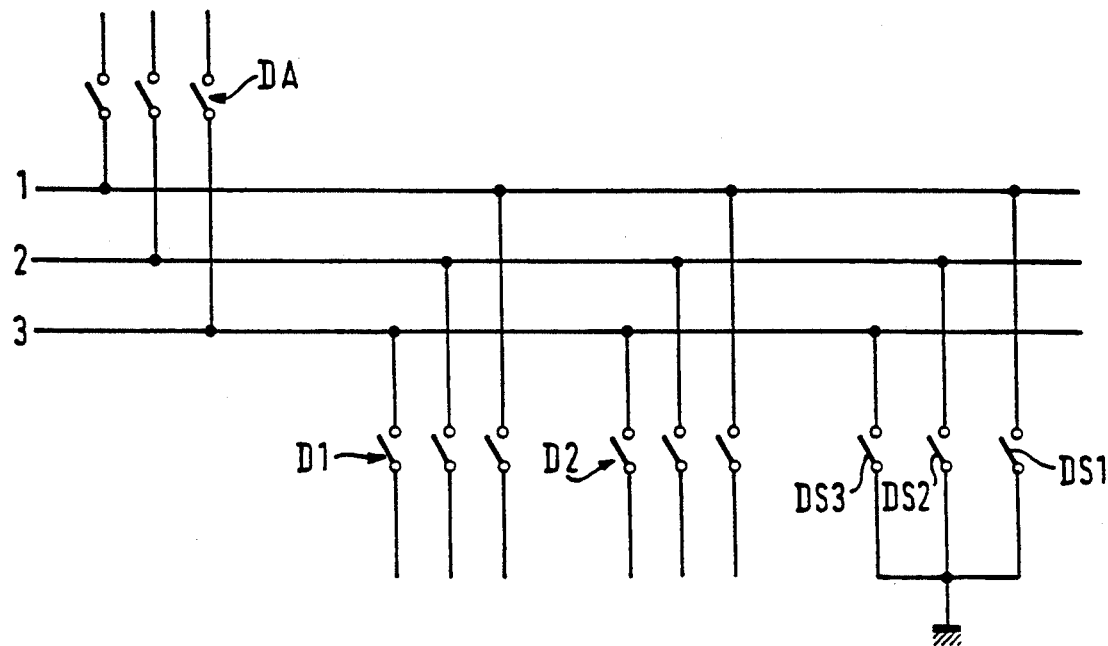
FIG. 22 is a circuit diagram of a station fitted with a prior art shunt circuit-breaker.

As shown in FIG. 22, a station comprising an inlet circuit-breaker DA and a plurality of three-phase outlets (phases 1, 2, and 3) protected by respective circuit-breakers D1, D2, etc., . . . , can be fitted with a shunt circuit-breaker DS which is a three-pole circuit-breaker whose poles DS1, DS2, and DS3 are individually controllable and connected between ground and a respective phase.

This type of circuit-breaker is used for grids having a grounded neutral presenting resistance or impedance. Under normal circumstances it is open.

In the event of a fault between one of the phases and ground, the pole corresponding to the faulty phase is closed, thereby suddenly reducing the voltage across the terminals of the fault and consequently extinguishing the fault arc. In most cases, the fault is thus eliminated by this operation and the pole of the circuit-breaker is immediately re-opened.

In the event of the fault not being overcome in this way, the circuit-breaker on the faulty outlet is opened.

Statistically, it has been observed that faults between a phase and ground generally disappear when the shunt circuit breaker is operated, and that service availability is thus greatly increased.

Figure 23:
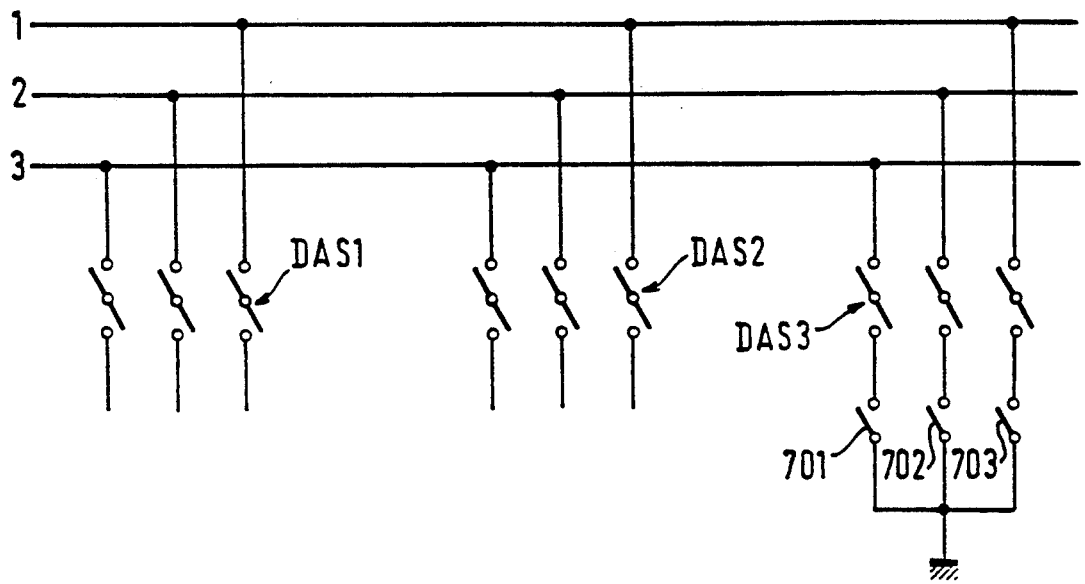
FIG. 23 is a circuit diagram of a station having the same functions as the station of FIG. 22, but fitted with self-disconnecting circuit-breakers of the invention.

FIG. 23 shows how the circuit of FIG. 22 should be modified to enable the shunt circuit-breaker function to be performed using self-disconnecting circuit-breakers of the invention. The circuit-breakers D1 and D2 of FIG. 22 are replaced by self-disconnecting circuit-breakers DAS1 and DAS2. The shunt circuit breaker is replaced by an isolating circuit-breaker DAS3 whose associated three-phase grounding section switch 70 (see FIG. 7) is fitted with individual controls for each of the poles such as to convert it into three separately controlled single-pole section switches 701, 702, and 703. In the event of a fault on one of the phases of an outlet, the section switch corresponding to said phase is closed and then opened. If the fault does not then disappear, the self-disconnecting circuit-breaker protecting the faulty outlet is opened.

Figure 24:
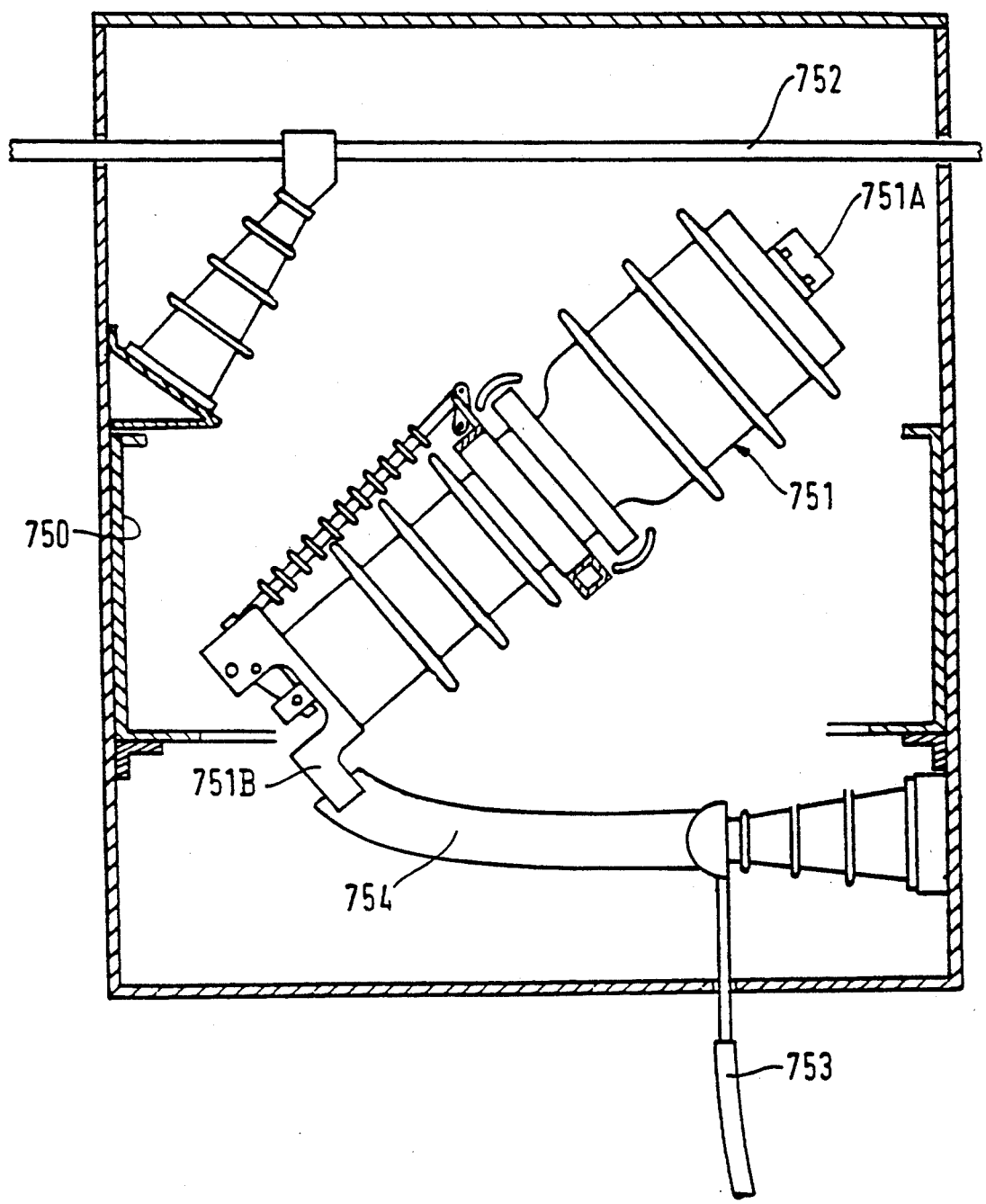
FIG. 24 shows a medium-tension bay that performs a full grounding function and that makes use of self-disconnecting circuit-breakers of the invention.

The self-disconnecting circuit-breaker of the invention is particularly suitable for making bays that enable a cable to be grounded. Such grounding is required by the standards in force in certain countries, in particular in the United Kingdom, where it is known under the English term "integral earthing". FIG. 24 shows a bay enabling such grounding to be performed. It includes an extractible drawer 750 enclosing the three poles of an isolating circuit-breaker of the invention. Only the pole 751 is visible in the figure since it is an end view. Reference 751A designates the top jaw terminal of the pole 751, and reference 751B designates its bottom jaw terminal. The bay includes a set of busbars 752 and a cable outlet 753. It may be observed that in comparison with the bay shown in FIGS. 6 and 7, the grounding section switch 70 has been omitted.

Figure 25:
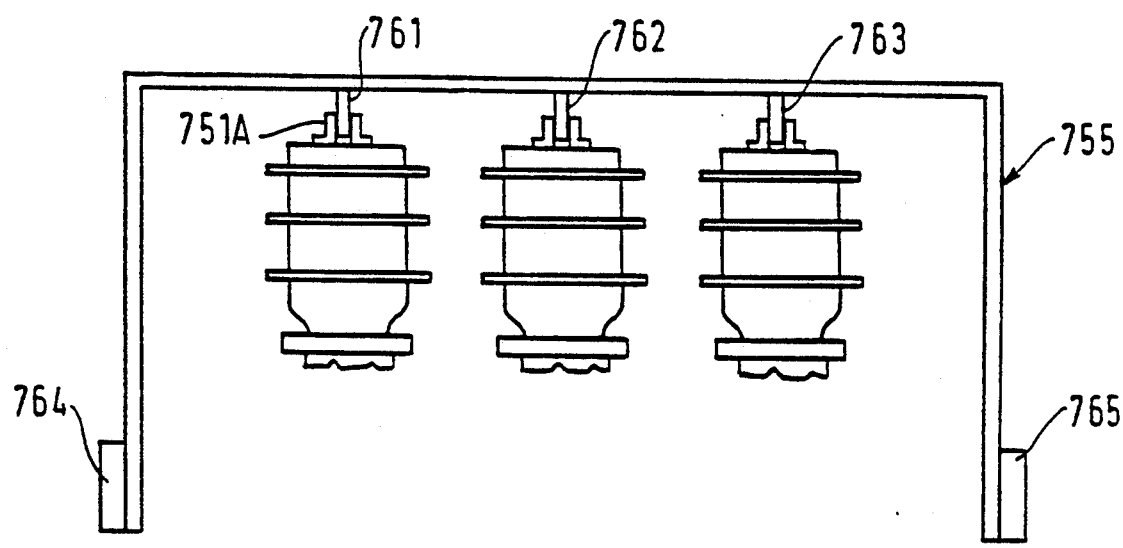
FIG. 25 shows a bracket used for integral grounding.

"Integral earthing" is performed as follows:
the self-disconnecting circuit-breaker is put into the disengaged position;
the drawer is pulled out;
the self-disconnecting circuit-breaker is tilted through 45° by rotating the supporting bar in a clockwise direction;
the three poles of the circuit-breaker are short circuited by means of a metal bracket 755 (FIG. 25) having three contacts 761, 762, and 763 that engage in the top jaw terminals 751A of the poles. The bracket also serves to ground the poles of the circuit-breakers since the branches of the bracket come into contact with the drawer which is grounded by the metal bar supporting the poles. The bracket also includes abutments 764 and 765 which serve to limit the rotary stroke of the poles in an anticlockwise direction when the poles are tilted back again, and which serves to maintain the poles at a sufficient distance from the busbars 752;
with the drawer still pulled-out and the poles still tilting at 45°, a metal extender 754 is fitted onto each of the bottom jaw terminals 751B of the poles;
the self-disconnecting circuit-breaker is then returned to the horizontal position and the drawer is closed;
the poles are rotated anticlockwise until they come into abutment, thereby having the effect of putting the extenders 754 into contact with the cable outlets; and
the self-disconnecting circuit-breaker is closed, thereby grounding the cables through the circuit-breaker.

If tension should be present on a cable at this moment, then the poles of the circuit-breaker open because of the resulting short circuit.

It can thus be seen that a bay fitted with the self-disconnecting circuit-breaker of the invention makes it possible to implement "integral earthing" by using a few accessories that are simple and completely reliable.

Naturally, by reversing the positions of the accessories, it is possible, if necessary, to achieve "integral earthing" of the busbars of a station via the circuit-breaker.

Figure 26:
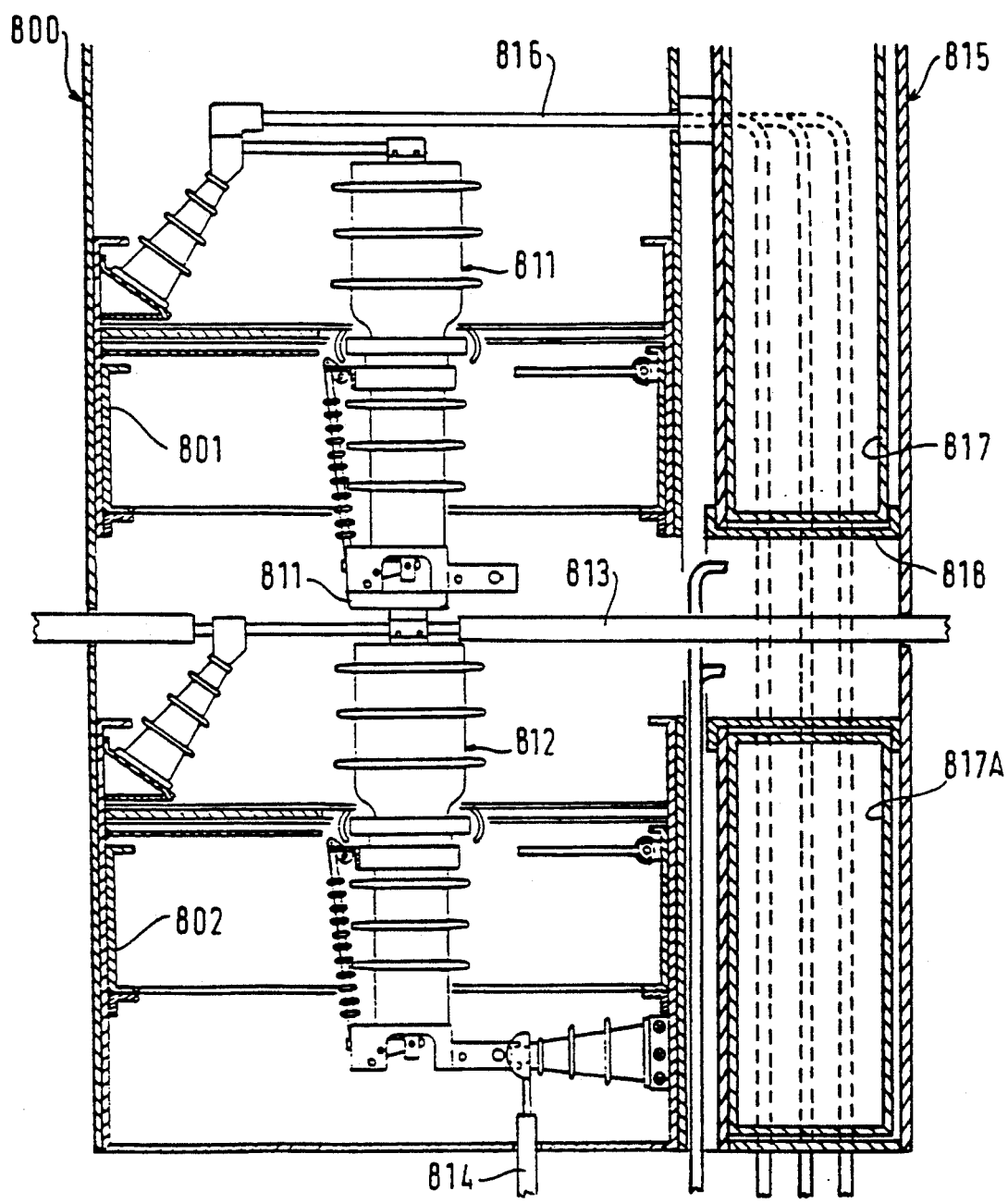
FIG. 26 shows a bay including two cabinets each containing a self-disconnecting circuit-breaker of the invention.
Figure 27:
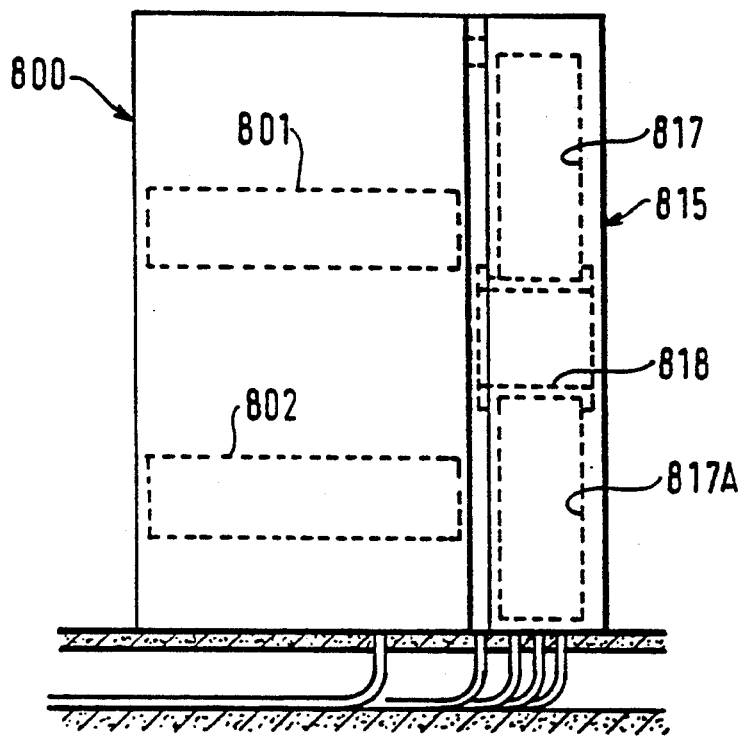
FIG. 27 is a side view of a group of two bays, each having two self-disconnecting circuit-breakers of the invention.
Figure 28:
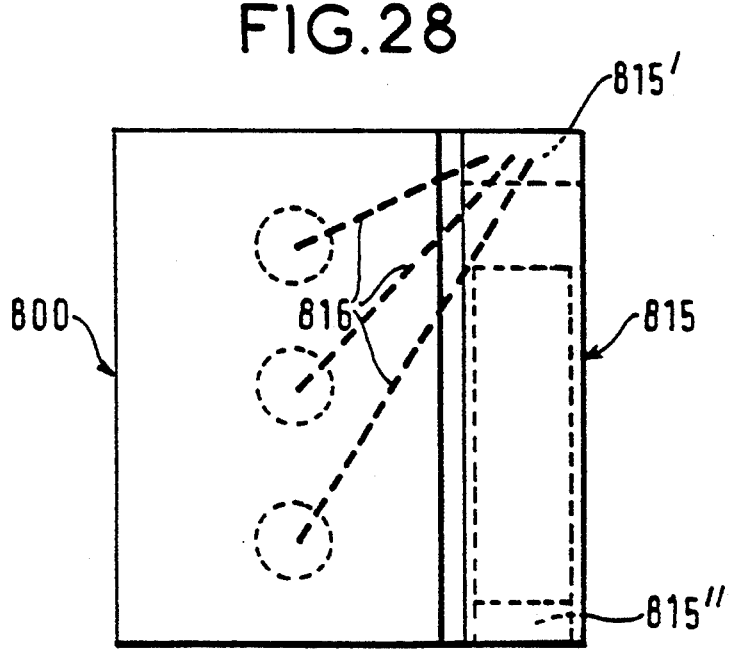
FIG. 28 is a plan view of the same group.

The invention applies to making bays that take up reduced ground area, as shown in FIGS. 26 to 28.

In FIG. 26, it can be seen that the same bay 800 shown in front view and in section comprises two identical cabinets each having its own drawer 801, 802, each of which contains its own self-disconnecting circuit-breaker 811, 812.

The top self-disconnecting circuit-breakers such as 811 are provided with current terminals 811' at the bottom ends of their poles which are adapted to cooperate with a set of busbars 813 placed between the two drawers. Cables such as 814 from the bottom self-disconnecting circuit-breakers such as 812 leave via the bottom of the bay as described above, in particular with reference to FIGS. 6 and 20. The cables 816 of the top self-disconnecting circuit-breakers such as 811 leave via a chute 815' at the back of the compartment 815. The compartment 815 contains two chests 817 and 817A that are separated by a metal sleeve 818 through which the busbars 813 pass. The chests contain the protective relays and all of the auxiliary equipment required for operating the isolating circuit breakers.

At the front of compartment 815, a chute 815" serves to house multiconductor cables for remote control and remote signalling purposes.

From the front face of such a bay, the busbar-passing sleeve 818 is used as a bay connection zone. In this zone there can be found:

inlet connectors for multiconductor remote control cables or for inter-bay links;

low voltage connectors for both protection chests; and connectors for the control and signalling circuits of the four drawers containing the self-disconnecting circuit-breakers.

It is important to observe that the low voltage chests may be made separately (subcontracted to a different factory) and assembled on site.

According to the invention, if a 24 kV medium-tension bay has a width $1=600$ mm and a depth $P=1300$ mm, and if a width $x=200$ mm is used for the adjacent compartment 815, then the ground area occupied by a pair of bays is close to one square meter, thus providing a saving of more than 100% compared with the smallest prior art bays that achieve the same functions but with less operating safety.

The above-described bay has other advantages:

only one frame is required for two self-disconnecting circuit breakers, thus providing considerable savings in implementation;

the protection chests may be made independently of a bay (thus making subcontracting possible) and may be installed on site;

the wiring within a bay is greatly simplified;

the self-disconnecting circuit-breakers can be properly ventilated;

there is a reduction in the risk of the protection chests being destroyed in the event of arcing taking place inside a bay; and protection can be reinforced by interposing plates of anti-arcing and fire-resistant material between the medium and low tension volumes.

In addition, each of the two self-disconnecting circuit-breakers in a given bay retains the following advantages specific thereto:

protected poles;

low weight of insulation;

insulation between phases provided by air;

reduced conductor length, minimum number of contacts;

the poles are installed on a grounded bar; and the portions of the poles lying outside the bottles are automatically protected without requiring an auxiliary energy source.

Industrially, it is no longer essential to assemble stations in a factory. Stations can be assembled on site using medium-tension elements and low tension elements that have been manufactured and inspected during mass production in a factory.

Bays of the type shown in FIGS. 26 and 28 can be made for any voltage up to 36 kV.

The invention is applicable to making medium-tension stations that are novel in design, cheap, and reliable.

If a prior art medium-tension electricity station is considered, it can be seen that whether installed in the town or in the country, such equipment is nearly always installed in a special building. The equipment is made up of prefabricated medium-tension bays each of which constitutes a separate entity with respect to cable inlets and cable outlets, with respect to driving equipment, and protection equipment and with respect to relay equipment.

A station is made up of a set of bays in alignment with the bays being connected to a set of busbars that are common to all of the bays.

It can be said that redundancy exists between the bays and the station since bay volumes are enclosed within a station volume.

Operators of medium-tension grids have always sought to minimize the consequences within a station of an accident that may occur in a bay. Further efforts are being made in this direction in the context of a European-wide campaign for improving the quality of electricity supply to subscribers:

efforts for conveying faults to ground and for avoiding symmetrical faults between phases that are always the most dangerous and cause the largest amount of damage; and efforts for avoiding arc propagation which could destroy bays other than the bay in which the accident has occurred.

In spite of that, it remains difficult in the event of a fault to direct arcing within metal bays of small size which are in any event filled with insulating materials that are combustible.

In all countries, operators suffer every year from several medium-tension stations being destroyed by fire, generally due to faults that have continued for a long time because the auxiliary energy source(s) for the protection means have run out while a fault was in progress.

Figure 29:
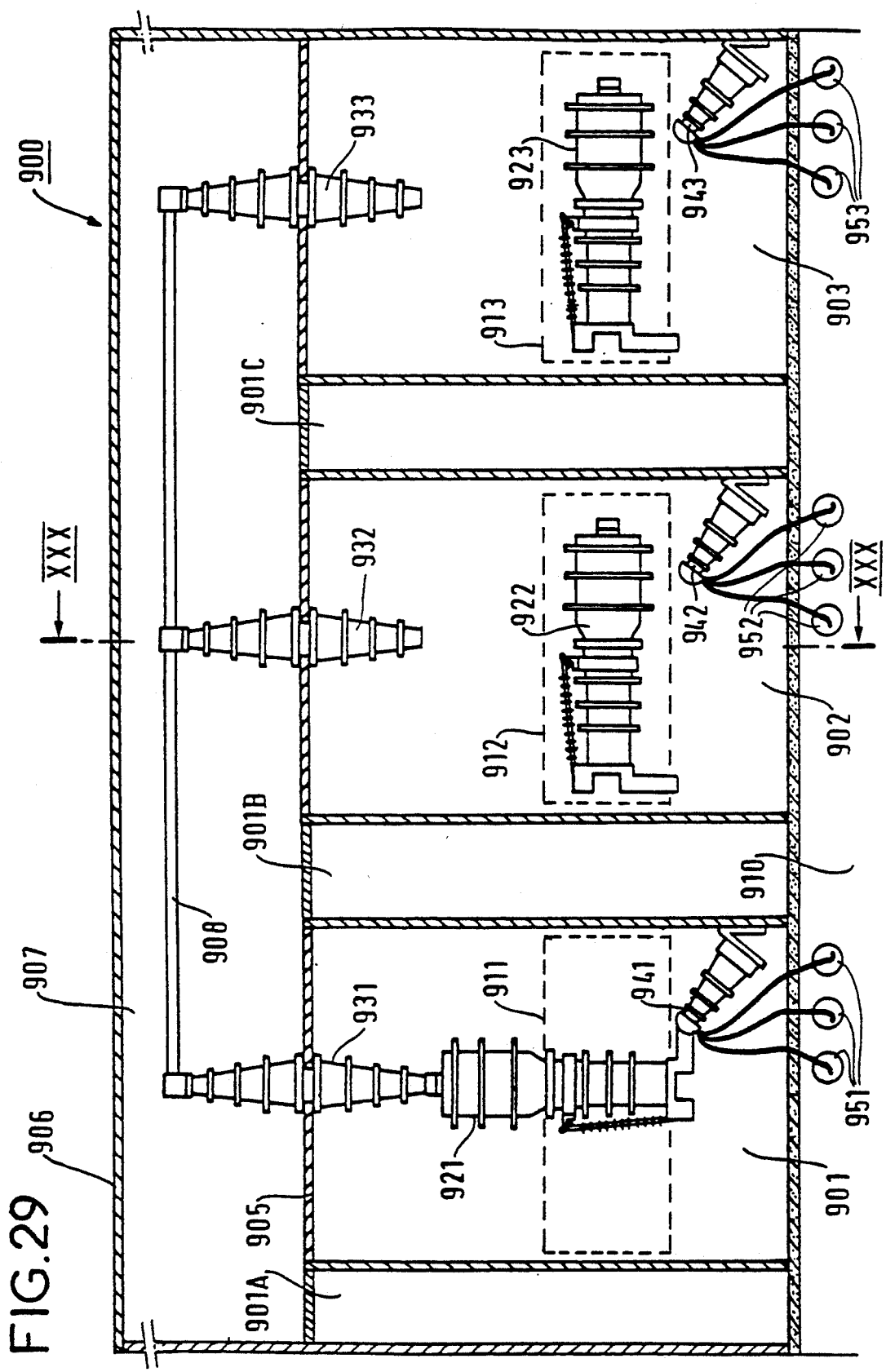
FIG. 29 is a front section view of a medium-tension station fitted with self-disconnecting circuit-breakers of the invention.
Figure 30:
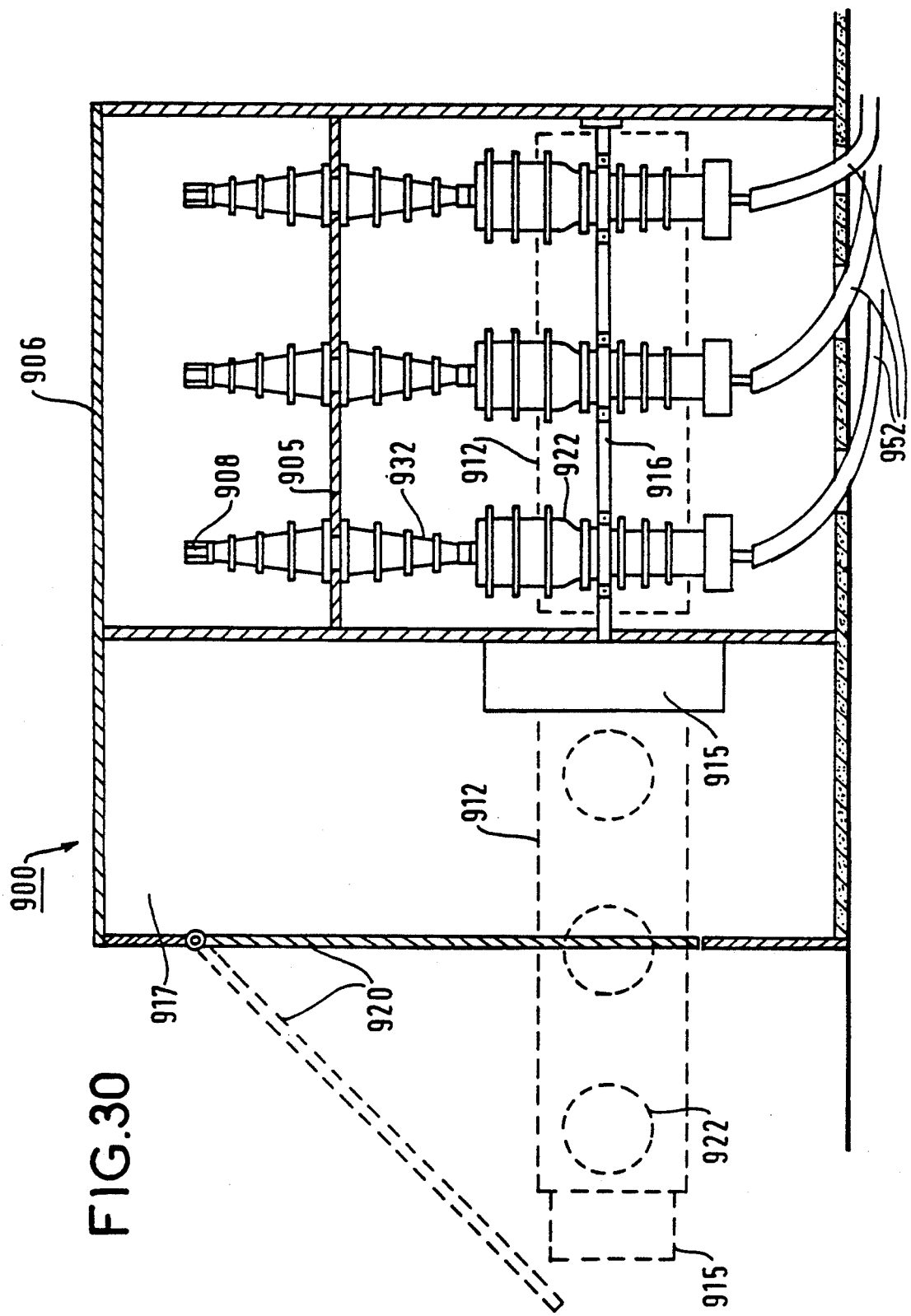
FIG. 30 is a side section view of the same station.

The self-disconnecting circuit-breaker makes it possible to implement a medium-tension station that is simple in structure and cheap, as shown in FIGS. 29 and 30.

In these figures, there can be seen a structure 900 which is generally in the form of a rectangular parallelepiped made of concrete, of glass fiber reinforced cement (GRC) or of equivalent fire-resistant building material, and which includes a plurality of cells 901, 902, and 903, each containing an isolating circuit-breaker of the invention. Each of the cells adjoins a compartment 901A, 901B, 901C containing protective equipment, preferably mounted on a corresponding sliding drawer and placed in a removable chest (not shown). The compartments and the cells are covered by a ceiling 905 co-operating with a roof 906 to define a compartment 907 containing a set of bus bars common to the compartments.

Each compartment receives a drawer 911, 912, 913 provided with a self-disconnecting circuit-breaker of the above-described type, 921, 922, 923 having a common support bar 916 and control box 915. These circuit-breakers may be connected to the set of bus bars by insulating feedthroughs 931, 932, 933 and to outlets 941, 942, 943 for cables 951, 952, 953 leaving via cableways formed in the base 910 of the station.

A walkway corridor 917 is provided at the front of the station (FIG. 30) and is closed in normal operation by a flap 920. When action is to be taken on one of the self-disconnecting circuit-breakers, e.g. isolating circuit-breaker 922, the flap is raised and the drawer 912 is pulled out as shown by dashed lines in FIG. 30.

Ventilation precautions are taken to avoid condensation or oxidization. The aerated structure of the circuit breakers of the invention facilitate making stations for outdoor use.

The self-disconnecting circuit-breaker of the invention is suitable for making contactor bays, using a vacuum bottle of suitable rating.

The station described above with reference to FIGS. 29 and 30 provides advantages of operating safety in addition to the advantages it provides in cheapness of construction. Mention is made of all of the advantages that are inherent to using self-disconnecting circuit-breakers of the invention. In addition, the design using compartments and cells made of concrete or analogous material ensures that faults between phases have little chance of propagating or of destroying the low voltage equipment required for operating, remote control, or remote signalling purposes.

Naturally, the uses to which the invention may be put are numerous and are not limited to the various examples given, with the invention being applicable to all medium-tension installations that use circuit-breakers, section switches, and current-measuring devices.

I claim:

1. A multipolar self-disconnecting circuit-breaker having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthroughs being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft.

2. A multipolar self-disconnecting circuit-breaker according to claim 1, wherein each pole comprises an insulating feedthrough comprising a first portion containing a vacuum bottle, said vacuum bottle including an insulating casing closed by first and second metal endplates, the first metal endplate carrying a first jaw terminal outside the casing and a fixed contact inside the casing, the second endplate having a moving metal rod carrying a moving contact passing therethrough in sealed manner, the insulating feedthrough including a cylindrical second portion, a metal tube is coaxially disposed inside said cylindrical second portion and being mechanically connected to the vacuum bottle and being electrically connected to said moving metal rod, said tube containing a control rod connected to said moving metal rod, the insulating feedthroughs of said poles being fixed to said metal bar substantially where the first and second portions of each feedthrough meet, a lever mechanically connecting the control rod for each pole to said control rod, said lever being hinged on an endpiece secured to the metal tube, an insulating arm hinged at one end to said lever and at a second end to a crank connected to said shaft, and said endpiece being mechanically and electrically connected to said metal tube and constituting a second jaw terminal.

3. A self-disconnecting circuit-breaker according to claim 2, wherein said first portion of said insulating feedthrough includes inside grooves extending parallel to the axis of the feedthrough and co-operating with the outside wall of the vacuum bottle to define ventilation channels, such that air flowing through the metal tube penetrates into said channels via holes through said tube.

4. A self-disconnecting circuit-breaker according to claim 2, wherein the vacuum bottle is placed in a cylindrical resin cage disposed inside said first portion of the feedthrough.

5. A self-disconnecting circuit-breaker according to claim 4, wherein said resin cage includes inside grooves parallel to an axis of said resin cage, said grooves co-operating with a wall of the vacuum bottle to define ventilation channels, and wherein air flowing along the metal tube penetrates into said channels via holes in said tube.

6. A self-disconnecting circuit-breaker according to claim 4, wherein said sheath is prevented from moving in translation by a spring clip clamped on said metal tube.

7. A self-disconnecting circuit-breaker according to claim 2, wherein the dielectric strength between said metal tube and said second portion of the isolating feedthrough is provided by a sheath of compressible insulating material slid over said metal tube and engaged in said second portion, and an insulating grease therebetween to facilitate assembly thereof.

8. A self-disconnecting circuit-breaker according to claim 7, wherein said sheath is made of latex.

9. A self-disconnecting circuit-breaker according to claim 2, wherein the moving parts between said control rod and said control shaft include a sprung backlash take-up mechanism.

10. A self-disconnecting circuit-breaker according to claim 2, wherein the end of the control rod includes a tubular end portion in which said moving rod is engaged, said moving rod having a slot, a first pin being engaged in said slot and passing through said control rod, a spring bearing against a first thrust washer in contact with said end of the control rod, and being in contact against a second thrust washer engaged in the moving rod and held by a second pin, said second pin passing through the moving rod.

11. A self-disconnecting circuit-breaker according to claim 2, wherein the mechanical connection between said metal tube and the vacuum bottle, and the electrical connection between said metal tube and said moving contact rod is by a sleeve fixed to said second endplate, a ring secured to said sleeve and to said tube, and a ring or concertina-type contact disposed inside said ring and surrounding said rod.

12. A self-disconnecting circuit-breaker according to claim 2, wherein the moving rod is screwed to the control rod, and wherein a set of contact springs fixed on said moving rod provide an electrical connection between the moving rod and the metal tube.

13. A self-disconnecting circuit-breaker according to claim 2, wherein the control rod is constituted by the moving rod of the vacuum bottle.

14. A self-disconnecting circuit-breaker according to claim 2, wherein said endpiece comprises two half-collars clamped on said metal tube and in abutment against the end of said second portion of the insulating feedthrough.

15. A self-disconnecting circuit-breaker according to claim 14, wherein the half-collars include studs engaged with a recess formed in said second portion of the insulating feedthrough to prevent said metal tube from rotating.

16. A self-disconnecting circuit-breaker according to claim 2, wherein a coil having a closed toroidal metal core is slid over said second portion of the insulating feedthrough, and located substantially at a junction between said first and second portions of the insulating feedthrough.

17. A self-disconnecting circuit-breaker according to claim 16, wherein the outside surface of the second portion of the insulating feedthrough is metal coated level with said coil and the support bar.

18. A self-disconnecting circuit-breaker according to claim 1, wherein the drive shaft is a rotary shaft.

19. A self-disconnecting circuit-breaker according to claim 1, wherein the drive shaft is a shaft which is displacable in translation along an axis of said shaft.

20. A self-disconnecting circuit-breaker according to claim 2, wherein in the vicinity of a throat, the feedthrough includes a metal grid integrally molded therewith and placed at a same potential as that of said metal tube.

21. A self-disconnecting circuit-breaker according to claim 1, wherein each feedthrough includes a second vacuum bottle connected in series with the first vacuum bottle, and wherein moving rods of the two bottles include means connecting said bottles together.

22. A medium-tension bay comprising at least one self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft.

23. A medium-tension bay according to claim 22, wherein the isolating circuit-breaker is placed in a drawer that slides in a chest including supporting insulators for a set of busbars and supporting insulators for cable outlets, said isolating circuit breaker being capable, in its section switch disengaged position of being contained completely within the drawer and of being extracted from the chest.

24. A medium-tension bay according to claim 23, wherein the chest includes a fixed first flap separating the space containing the busbars and the space for the drawer in part, in part.

25. A medium-tension bay according to claim 24, wherein the chest includes a moving second flap which, when the circuit-breaker is in operation, occupies a position above the first flap and which, when the circuit-breaker is placed in its isolating position, takes up a position where it co-operates with the first flap to completely prevent access to the busbar space from the drawer space.

26. A bay according to claim 25, wherein the second flap is moved by a disk rotated by rotating the bar, thereby actuating at least one linkage connected to said second flap which slides in slideways fixed to the chest.

27. A bay according to claim 26, wherein the disk includes a notch co-operating with a catch for locking the disk when the drawer is pulled out, the catch being unlocked by the drawer when the drawer is pushed back in.

28. A bay according to claim 23, including a first flap having a first portion including three rectangular pieces each provided with a notch and connected to an elongate piece provided with oblong slots, and a second portion comprising three rectangular pieces each provided with a notch and connected together by an elongate piece provided with studs engaging in the slots, the portions being urged towards each other by a spring, the bay including a second flap parallel to the first flap and comprising a first portion having three rectangular pieces connected together by a piece provided with oblong slots, and a second portion comprising three rectangular pieces connected together by an elongate piece provided with slots in which said studs are engaged, said portions being urged towards each other by springs, the two flaps being disposed parallel to each other and being driven by the movement of the poles or by a mechanism that is linked to the movement of the poles.

29. A bay according to claim 23, wherein the drawer includes a rotatably mounted shutter, means for rotating said shutter by rotation of the self-disconnecting circuit-breaker metal bar in passing from a non-disconnecting position to a disconnecting position, and means for grounding said poles when the self-disconnecting circuit-breaker is in said disconnecting position.

30. A medium-tension bay according to claim 23, wherein said means for rotating said metal bar comprises a motor and stepdown gear chest unit fixed on the drawer and co-operating with a gear wheel secured to the bar.

31. A medium-tension bay according to claim 23, including a grounding section switch serving to ground the outlet cables that are protected by the isolating circuit-breaker.

32. A bay according to claim 31, wherein the grounding section switch includes single pole electromagnetic controls.

33. A medium-tension bay including; two sets of busbars, a cable outlet, and two drawers, each drawer being fitted with a self-disconnecting circuit-breaker, having both switching and disconnecting functions comprising for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft, and wherein each pole of said at least one self-disconnecting circuit-breaker comprises two feedthroughs which are connected electrically in parallel.

34. A medium-tension bay including a self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft, with each pole being in series with a current transformer whose outside shape is substantially the same and whose volume is substantially the same as a pole, which transformer is disposed head to tail relative to the pole and is fixed on a common support metal bar for the poles of the self-disconnecting circuit-breaker.

35. A medium-tension bay comprising a self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft, a set of busbars, and a set of cable outlets, said cables being capable of being integrally grounded via the circuit-breaker by means of a bracket that short circuits the top jaw terminals of the circuit-breaker and that puts the top jaw terminals to ground potential by making contact with the drawer of the circuit-breaker, and by means of three extender conductors making contact between the bottom jaw terminals of the circuit-breaker and the cable outlets.

36. A bay according to claim 35, wherein the busbars are grounded by reversing the respective functions of the bracket and of the extender conductors.

37. A bay according to claim 35, wherein the bracket includes electrical and mechanical abutments for limiting the rotary stroke of the drawer.

38. A medium-tension bay including two drawers disposed one above the other, each associated with a respective self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft, the self-disconnecting circuit-breakers co-operating with a common set of busbars disposed between the two drawers.

39. A bay according to claim 38, wherein the cables of the top isolating circuit-breaker pass through a first chute disposed at the back of a compartment adjacent to the bay.

40. A bay according to claim 39, wherein the compartment includes two removable low tension chests containing protection relays and all of the auxiliary equipment required for operating the isolating circuit-breakers.

41. A bay according to claim 39, wherein the front of said compartment has a second chute placed thereat containing multiconductor cables for remote control or for remote signalling.

42. A bay according to claim 39, wherein the set of busbars penetrates into said compartment via a bar-passing sleeve.

43. A contactor bay including a self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means contained in a box fixed to said metal bar for actuating said drive shaft.

44. A medium-tension station comprising a substantially rectangular structure made of reinforced cement said structure comprising a plurality of compartments each containing a self-disconnecting circuit-breaker, having both switching and disconnecting functions comprising, for each pole thereof, an insulating feedthrough containing a vacuum bottle, the feedthrough including a first contact at a first end connected to a first terminal of the bottle and co-operating with an inlet conductor, and a second contact at a second end connected to a second terminal of the bottle and co-operating with an outlet conductor, the feedthrough being fixed to a metal bar mounted for movement in a 90° rotation to effect said disconnecting function, means operatively connecting said vacuum bottle to a common drive shaft for performing said switching function, said common drive shaft running along and being protected by said metal bar and bottle drive control means for contained in a box fixed to said metal bar for actuating said drive shaft, each compartment being associated with a cell containing a low tension apparatus for operating the self-disconnecting circuit-breakers and for remote control and remote signalling purposes, the compartments and the cells having a ceiling overlying the compartments and cells and co-operating with a roof to define a compartment in which a set of busbars is placed that is in common to the self-disconnecting circuit-breakers with which the busbars co-operate by means of insulating feedthroughs, the station further including a passage at a front face thereof, with the outlet cables passing in cableways formed in a base of the station.

* * * * *